United States Patent [19]

Namba et al.

[11] Patent Number: 5,321,608
[45] Date of Patent: Jun. 14, 1994

[54] METHOD AND SYSTEM FOR PROCESSING NATURAL LANGUAGE

[75] Inventors: Yasuhara Namba, Atsugi; Hiroshi Kinukawa, Machida; Akihiro Hirai, Tokorozawa, all of Japan

[73] Assignee: Hitachi, Ltd., Tokyo, Japan

[21] Appl. No.: 799,562

[22] Filed: Nov. 27, 1991

[30] Foreign Application Priority Data

Nov. 30, 1990 [JP] Japan ................................. 2-337091

[51] Int. Cl.$^5$ ............................................. G06F 3/00
[52] U.S. Cl. ............................................... 364/419.08
[58] Field of Search ..................... 364/419, 275, 419.08

[56] References Cited

U.S. PATENT DOCUMENTS

| | | | |
|---|---|---|---|
| 4,502,128 | 2/1985 | Okajima et al. | 364/419 |
| 4,566,078 | 1/1986 | Crabtree | 364/900 |
| 4,641,264 | 2/1987 | Nitta et al. | 364/419 |
| 4,706,212 | 11/1987 | Toma | 364/419 |
| 4,713,775 | 12/1987 | Scott et al. | 364/421 |
| 4,829,423 | 5/1989 | Tennant et al. | 364/419 |
| 4,914,590 | 4/1990 | Loatman et al. | 364/200 |
| 4,974,191 | 11/1990 | Amirghodsi et al. | 364/900 |
| 5,197,005 | 3/1993 | Shwartz et al. | 364/419 |

FOREIGN PATENT DOCUMENTS

1-222326 of 0000 Japan.

OTHER PUBLICATIONS

"An Inquiring System Capable of Asking Operating Procedures for a Workstation in Natural Japanese", Nikeei Electronics, 1985, No. 377, pp. 225–243. (Provided in Japanese).

Primary Examiner—Donald E. McElheny, Jr.
Attorney, Agent, or Firm—Fay, Sharpe, Beall, Fagan, Minnich & McKee

[57] ABSTRACT

The invention is featured in that the natural language process can be made in a way that a chained functions structure expressing relationships among concepts of elements of the natural language constructing the character strings is generated, a rule table which stores in advance rules of association relationship between the chained functions structure and form of a command language which the processor system can execute is looked up, the generated chained functions structure is converted to a form which the process can be executed, and the command language are obtained as results of the analysis by incorporating the information as to the operating statuses of the processor system into the converted form. The invention enables the computer to operate in a desired mode with input of usual natural language without use of any of the formal languages usually given to the computer (special languages and command defined for the computer).

30 Claims, 28 Drawing Sheets

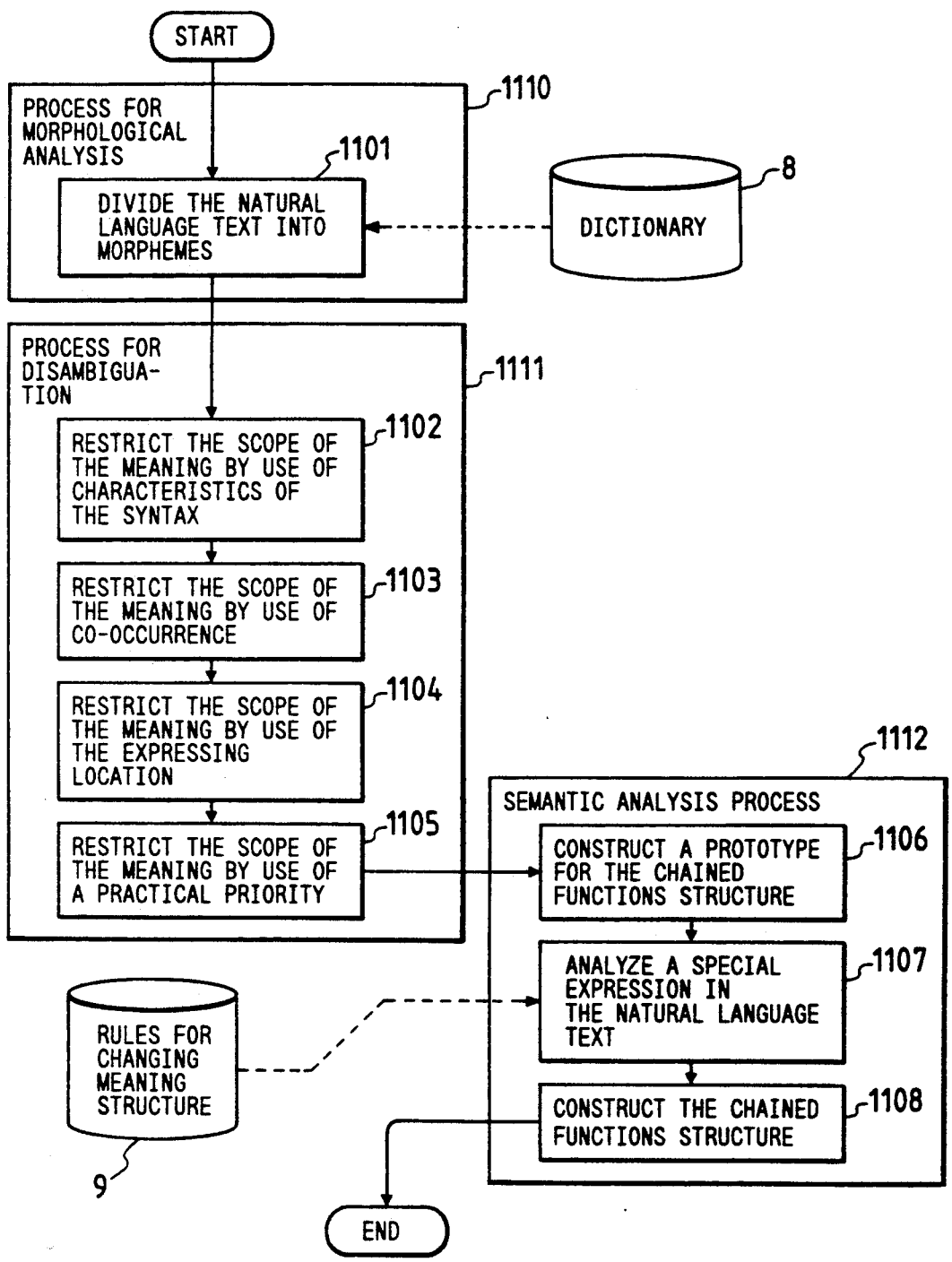

FIG. 7

| NAME OF PROCESS | EXAMPLES | | |
|---|---|---|---|
| | NATURAL LANGUAGE TEXT | BEFORE THE PROCESS | AFTER THE PROCESS |
| 1107(A) APPROVAL OF THE QUOTATION | "TAKING A LESSON FROM THE PAST" | NATURAL LANGUAGE EXPRESSION:" ATTRIBUTE:QUOTATION MARK<br>NATURAL LANGUAGE EXPRESSION: TAKING A LESSON FROM THE PAST<br>NATURAL LANGUAGE EXPRESSION:" ATTRIBUTE:QUOTATION MARK | NATURAL LANGUAGE EXPRESSION: TAKING A LESSON FROM THE PAST ATTRIBUTE:QUOTATION |
| 1107(B) DELETION OF THE UNDEFINED WORDS | SEMANTIC ANALYSIS PROCESS (WHEREIN SAID ANALYSIS IS FOR A WORD NOT SHOWN IN THE DICTIONARY) | NATURAL LANGUAGE EXPRESSION:SEMANTIC<br>NATURAL LANGUAGE EXPRESSION:ANALYSIS ATTRIBUTE:UNDEFINED WORD<br>NATURAL LANGUAGE EXPRESSION:PROCESS | NATURAL LANGUAGE EXPRESSION:SEMANTIC<br>NATURAL LANGUAGE EXPRESSION:PROCESS |
| 1107(C) COMBINATION OF NUMERICAL VALUES AND UNITS | 1989 YEAR | NATURAL LANGUAGE EXPRESSION:1989 ATTRIBUTE:NUMERICAL VALUE<br>NATURAL LANGUAGE EXPRESSION:YEAR ATTRIBUTE:UNIT | NATURAL LANGUAGE EXPRESSION:1989 A LABEL FOR THE MEANING: YEAR |

FIG. 8

EXAMPLES

| NAME OF PROCESS | NATURAL LANGUAGE TEXT | BEFORE THE PROCESS | AFTER THE PROCESS |
|---|---|---|---|
| 1107(D) ANALYSIS OF PUNCTUATION MARKS | CALCULATE AND PRINT. | NATURAL LANGUAGE EXPRESSION: ATTRIBUTE: PUNCTUATION ← NORMAL TERM OF OPERATION INSTRUCTIONS: PRINT ATTRIBUTE: FUNCTION ← NATURAL LANGUAGE EXPRESSION: ATTRIBUTE: PUNCTUATION ← NORMAL TERM OF OPERATION INSTRUCTIONS: CALCULATE ATTRIBUTE: FUNCTION | ATTRIBUTE: ROOT → NORMAL TERM OF OPERATION INSTRUCTIONS: CALCULATION ATTRIBUTE: FUNCTION, NORMAL TERM OF OPERATION INSTRUCTIONS: PRINT ATTRIBUTE: FUNCTION |
| 1107(E) ANALYSIS OF EXPRESSIONS OF NUMERICAL VALUE COMBINED COMPARISON, PARTIAL NEGATION, STARTING POINT AND ENDING POINT | FROM THE 6TH MONTH TO THE 7TH MONTH | NATURAL LANGUAGE EXPRESSION: 6 A LABEL FOR THE MEANING: MONTH ← NATURAL LANGUAGE EXPRESSION: FROM ← NATURAL LANGUAGE EXPRESSION: 7 A LABEL FOR THE MEANING: MONTH | NATURAL LANGUAGE EXPRESSION: 6 A LABEL FOR THE MEANING: MONTH RELATION BETWEEN NATURAL LANGUAGE EXPRESSION AND A LABEL FOR THE MEANING: MORE THAN ← NATURAL LANGUAGE EXPRESSION: 7 A LABEL FOR THE MEANING: MONTH RELATION BETWEEN NATURAL LANGUAGE EXPRESSION AND A LABEL FOR THE MEANING: LESS THAN |

FIG. 9

EXAMPLES

| NAME OF PROCESS | NATURAL LANGUAGE TEXT | BEFORE THE PROCESS | AFTER THE PROCESS |
|---|---|---|---|
| 1107(F) RECOVERY PROCESS OF SUBSTANTIVES AND DECLINABLE WORDS | BAR GRAPH | NATURAL LANGUAGE EXPRESSION:BAR GRAPH ATTRIBUTE:CONDITION | ATTRIBUTE:PRONOUN A LABEL FOR THE MEANING:PRONOUN IN THE CLOSE CASE TO THE SPEAKERS → NORMAL TERM OF OPERATION INSTRUCTIONS:GRAPHIZE ATTRIBUTE:FUNCTION → NATURAL LANGUAGE EXPRESSION: BAR GRAPH ATTRIBUTE:CONDITION |
| 1107(G) ANALYSIS OF LOGICAL COMBINATION EXPRESSION | RETRIEVE TV AND VIDEO IN JAPANESE | NORMAL TERM OF OPERATION INSTRUCTIONS:RETRIEVE ATTRIBUTE:FUNCTION ← NATURAL LANGUAGE EXPRESSION:VIDEO CELL DATA DEPENDENT WORD: を (WITH, ETC.) A LABEL FOR THE MEANING:SALES ITEM ← NATURAL LANGUAGE EXPRESSION:TV CELL DATA DEPENDENT WORD:AND A LABEL FOR THE MEANING:SALES ITEM | NORMAL TERM OF OPERATION INSTRUCTIONS:LOGICAL-OR ATTRIBUTE:FUNCTION → NORMAL TERM OF OPERATION INSTRUCTIONS:RETRIEVE ATTRIBUTE:FUNCTION ← NATURAL LANGUAGE EXPRESSION:TV CELL DATA DEPENDENT WORD:AND A LABEL FOR THE MEANING:SALES ITEM ; NORMAL TERM OF OPERATION INSTRUCTIONS:RETRIEVE ATTRIBUTE:FUNCTION ← NATURAL LANGUAGE EXPRESSION:VIDEO CELL DATA DEPENDENT WORD: を (WITH, ETC.) A LABEL FOR THE MEANING:SALES ITEM |

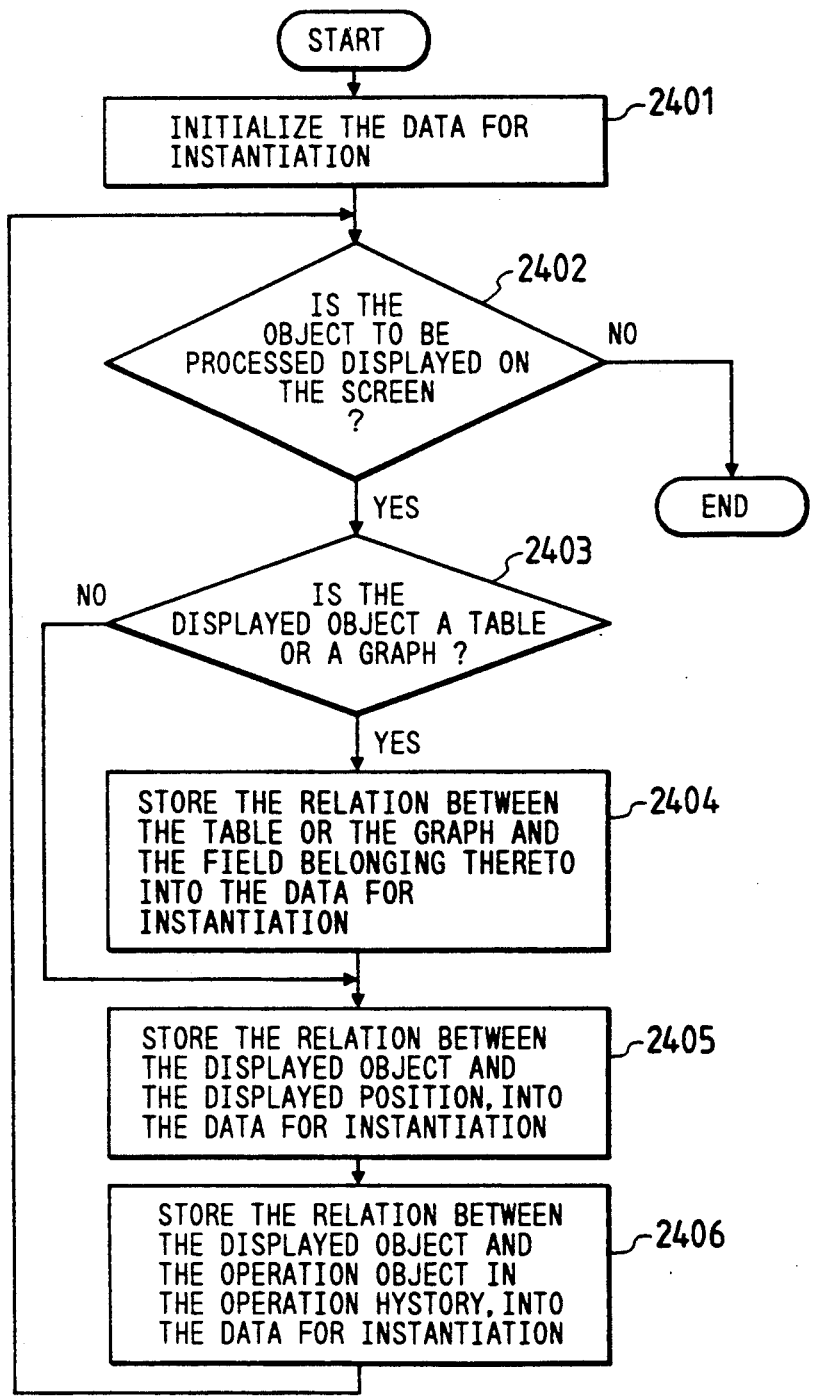

FIG. 14

| | | | | 001 | 002 |
|---|---|---|---|---|---|
| RULE ID NO. —35 | | | —40 | | |
| PART OF ANTECEDENT 36 | PART OF ANTECEDENT IN NATURAL LANGUAGE 38 | NORMAL TERM OF OPERATION INSTRUCTIONS | | MOVE | |
| | | ORDER OF PRIORITY —41 | | 001 | |
| | | CONDITION FOR THE CHILD NODE 1 | NAME OF FORMAL VARIABLES IDENTIFIER. CONDITION FOR THE NATURAL LAGUAGE EXPRESSION. ATTRIBUTE CONDITION. CONDITION FOR THE DEPENDENT WORD EXPRESSION. CONDITION FOR ADDING THE DEPENDENT WORD. | OBJ_1  TABLE  WITH  OPTIONAL | |
| | | CONDITION FOR THE CHILD NODE 2 | NAME OF FORMAL VARIABLES IDENTIFIER. CONDITION FOR THE NATURAL LAGUAGE EXPRESSION. ATTRIBUTE CONDITION. CONDITION FOR THE DEPENDENT WORD EXPRESSION. CONDITION FOR ADDING THE DEPENDENT WORD. | OBJ_2  DISPLAYED POSITION TO  OPTIONAL | |
| | | ⋮ | | ⋮ | |
| | | CONDITION FOR THE CHILD NODE n 42 | NAME OF FORMAL VARIABLES IDENTIFIER. CONDITION FOR THE NATURAL LAGUAGE EXPRESSION. ATTRIBUTE CONDITION. CONDITION FOR THE DEPENDENT WORD EXPRESSION. CONDITION FOR ADDING THE DEPENDENT WORD. | | |
| | 39— PART OF ANTECEDENT OF THE APPLICATION | CONDITION 1 CONDITION 2 ⋮ CONDITION m | | | |
| PART OF CONSEQUENT 37 | PART OF CONSEQUENT IN NATURAL LANGUAGE 43 | | TEMPLATE FOR THE LANGUAGE OF OPERATION INSTRUCTION 1 ⋮ 2 TEMPLATE FOR THE LANGUAGE OF OPERATION INSTRUCTION k | RETURN (TABLE) | |
| | PART OF CONSEQUENT OF THE APPLICATION 44 | | TEMPLATE FOR THE LANGUAGE OF OPERATION INSTRUCTION k+1 | MOVE TABLE (OBJ_1) TO PLACE (OBJ_2) | |
| | | | TEMPLATE FOR THE LANGUAGE OF OPERATION INSTRUCTION k+2 | | |
| | | | ⋮ | | |
| | | | TEMPLATE FOR THE LANGUAGE OF OPERATION INSTRUCTION k+ℓ | | |

| 002 | 003 | 004 |
|---|---|---|
| RETRIEVE | GRAPHIZE | |
| 001 | 001 | |
| OBJ_1<br><br>FIELD<br>WITH<br>OPTIONAL | OBJ_1<br><br>TABLE<br>WITH<br>OPTIONAL | |
| | OBJ_2<br>BAR GRAPH<br>CONDITION<br>BY<br>OPTIONAL | |
| | | |
| | | |
| | | |
| RETURN (TABLE) | RETURN (TABLE) | |
| SELECT FIELD (OBJ_1)<br>  IN TABLE (OBJ_1)<br>  INTO NEW_NAME | GRAPHIZE TABLE (OBJ_1)<br>   WITH BAR_GRAPH | |
| | | |

| A LABEL FOR THE MEANING | METHOD FOR INSTANTIATION | | | |
|---|---|---|---|---|
| | TABLE | FIELD | PLACE | |
| PRONOUN IN THE CLOSE CASE TO THE SPEAKERS | WORK_TABLE_1 | | | |
| RIGHT UP | WORK_TABLE_1 | | RIGHT_UP | |
| CENTER | | | CENTER | |
| LEFT BELOW | | | LEFT_BELOW | |
| SALES | GOODS_MASTER | SALES | | |
| | | | | |

10

SELECT SALES IN GOODS_MASTER INTO WORK_TABLE_2    67

EXPRESS THE SALES BY A BAR GRAPH AND MOVE IT TO LEFT BELOW

| A LABEL FOR THE MEANING | METHOD FOR INSTANTIATION ||||
| --- | --- | --- | --- | --- |
| | TABLE | FIELD | PLACE | |
| PRONOUN IN THE CLOSE CASE TO THE SPEAKERS | WORK_TABLE_2 | | | |
| RIGHT UP | WORK_TABLE_1 | | RIGHT UP | |
| CENTER | WORK_TABLE_2 | | CENTER | |
| LEFT BELOW | | | LEFT BELOW | |
| SALES | WORK_TABLE_2 | SALES | · | |

GRAPHIZE WORK_TABLE_2 WITH BAR_GRAPH   69

| A LABEL FOR THE MEANING | METHOD FOR INSTANTIATION | | | |
|---|---|---|---|---|
| | TABLE | FIELD | PLACE | |
| PRONOUN IN THE CLOSE CASE TO THE SPEAKERS | WORK_TABLE_2 | | | |
| RIGHT UP | WORK_TABLE_1 | | RIGHT_UP | |
| CENTER | WORK_TABLE_2 | | CENTER | |
| LEFT BELOW | | | LEFT_BELOW | |
| SALES | WORK_TABLE_2 | SALES | | |

10

MOVE WORK_TABLE_2 TO LEFT_BELOW   70

| A LABEL FOR THE MEANING | METHOD FOR INSTANTIATION | | | |
|---|---|---|---|---|
| | TABLE | FIELD | PLACE | |
| PRONOUN IN THE CLOSE CASE TO THE SPEAKERS | WORK_TABLE_2 | | | |
| RIGHT UP | WORK_TABLE_1 | | RIGHT_UP | |
| CENTER | | | CENTER | |
| LEFT BELOW | WORK_TABLE_2 | | LEFT_BELOW | |
| SALES | WORK_TABLE_2 | SALES | | |
| | | | | |

10

METHOD AND SYSTEM FOR PROCESSING NATURAL LANGUAGE

BACKGROUND OF THE INVENTION

1. Field of the Invention

The present invention relates to a method and system for processing natural language in a natural language interface disposed between a computer and a human being and governed by a natural language.

2. Description of the Prior Art

A technique associated to the present invention was disclosed in an article entitled "An Inquiring System Capable of Asking Operating Procedures for a Workstation in Natural Japanese," Nikkei Electronics, No. 1985.9.9, pp. 225-243.

The technique described there was mentioned to be capable of guiding the operating procedures depending on the information display on the screen. A syntax and meaning of a Japanese question are analyzed to output an answer. The technique includes functions for correcting errors of postpositional particles and recovering omission of words with use of common senses of the workstation. It was described in the article that flow of enquiry is accumulated n a subject storage to generate an answer conceiving flow of the subject.

The previous technique mentioned above has the disadvantage that the natural language is hardly processed if questions have unsolved ambiguity or if the questions can be interpreted only when they meet conditions at a time of operation. This is because the answer is generated by looking up the information as to the flow of the questions and answers.

Also, the previous technique has the disadvantage that operating on the very object being currently handled is not taken into account, as it is to guide the operation of the computer (workstation).

SUMMARY OF THE INVENTION

In view of the foregoing, it is a first object of the present invention to provide a natural language process and system that can have an input of a natural language text entered for an object to be operated and can operate a system, for example, a decision support system (DSS), corresponding to the input.

Another object of the present invention is to provide a natural language process and system available for a variety of application systems with a computer as a natural language interface.

Briefly, the foregoing objects are accomplished in accordance with aspects of the present invention by the natural language process and system.

The natural language process can be accomplished in a way that character strings of a natural language are entered from the input device, meanings of the entered character strings are analyzed with use of information as to operating statuses of the processor system in response to the input device, processes are executed depending on results of the analysis, and results of the execution are output to the output device. The computer system executing the process comprises a storage for storing a dictionary as to a natural language and information as to operating statuses of the computer, an input device for entering character strings of the natural language, and an output device.

More particularly, the natural language process can be accomplished in a way that a chained functions structure expressing relationships among concepts of elements of the natural language constructing the character strings is generated, a rule table which stores n advance rules of association relationship between the chained functions structure and form of a command language which the processor system can execute is looked up, the generated chained functions structure is converted to a form which the process can be executed, and the command language are obtained as results of the analysis by incorporating the information as to the operating statuses of the processor system into the converted form, and the command language is executed.

In the natural language process, the result of execution is output to the output device as a general interaction is taken into account as the interface between the computer and human being. However, the results of execution may not always be output to the output device.

With the operations described above, the present invention is featured as follows.

Information as to operating statuses of the computer system is updated, and its history is managed. They, therefore, can be updated when meaning of a character string is analyzed. With use of the information managed in the history, the variety of processes executed next can be reduced. It is possible to generate an operation instructions language corresponding to a process which can be evaluated as the most adequate among the processes reduced in the variety.

Even if the entered natural language text contains any of pronouns, demonstrative, or similar words to be used for indication, it can be determined what it indicates by looking up the information as to the operating statuses of the computer system. A user who uses the natural language process or system according to the present invention, therefore, can operate the computer with use of a natural language (English, Japanese, etc.) which he/she uses every day.

The usual natural language contains many expressions, such as omissions of declinable words and indeclinable parts of speech, partial negations, and similar words that the conventional techniques are hard to analyze. In accordance with the present invention, however, rules of interpretation for such special expressions are provided in advance. They therefore can be interpreted on the basis of the rules. This means that such natural language texts as conversation can be entered.

Further, the present invention can be implemented in less dependency of the computer on applications. The reason is that the dictionary for the natural language and the rules used for a variety of processes to implement the present invention are tabulated, and contents of the tables can be easily rewritten as compared with programmed procedures.

As can be seen from the description above, the most distinguished advantage of the present invention consists in particular in the fact that the system can make the computer operate in a desired mode with input of usual Japanese or English natural language, which generally is a sentence but may be words, without use of any of the formal languages usually given to the computer (special languages and command defined for the computer) and the operation instructions language called in the embodiments of the present invention.

The foregoing and other objects, advantages, manner of operation and novel features of the present invention will be understood from the following detailed descrip-

BRIEF DESCRIPTION OF THE DRAWINGS

FIG. 6 is a detailed flow chart for constructional process of the chained functions structure (step 11) in FIG. 4.

FIGS 7, 8, and 9 are an example of processes as to special expressions in the natural language text (step 1107 in FIG. 6).

FIG. 13 is a detailed flow chart for a process of acquiring and storing the information of the system, particularly of a display (step 24) in FIG. 4.

FIGS. 14 and 15 are an example of meaning structure changing rules tables 9.

DETAILED DESCRIPTION OF THE PREFERRED EMBODIMENTS

With reference to the drawings, embodiments of the present invention will be described herein below.

A decision support system embodying the present invention will be described first. A decision support system is a system which can be designated by the user to perform the functions of retrieving data from a database, representing in the form of graphs or tables the result obtained from this database retrieval operation, and also displaying, deleting and editing the result of this representation so that the user can make decisions more efficiently. A specific example of such a decision support system is the EXCEED (manufactured by Hitachi, Ltd.). To operate a decision support system not applying the present invention, it is inevitable for the user to enter some language or commands prepared specially for the operation of the system. Such prepared language or command will herein below be referred to as language of operation instructions (or command language extension).

In this embodiment, however, the sentences in natural language which are entered by the user are mostly operation requests (sentences for requesting operations of the computer). They are in general the sentences in natural language whose meaning includes the object the operation request is intended for and the type of the request. An example of this operation request is an enquiry addressed to the computer on a facet based on a quality of the user.

Figure 1:
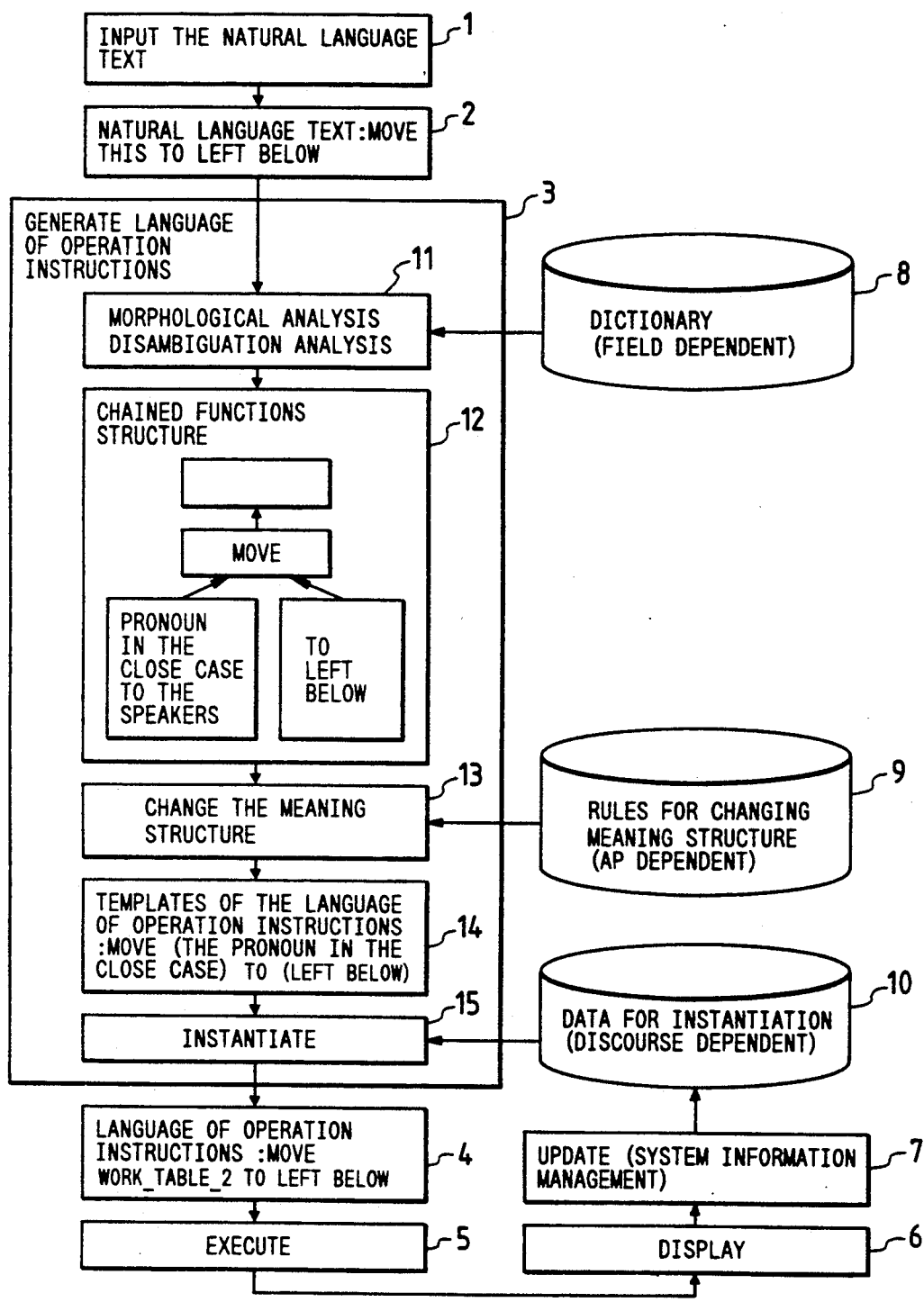
FIG. 1 is an outline illustrating an embodiment according to the present invention.

FIG. 1 is an outline for process of an embodiment according to the present invention. First, an operator (user) should enter a natural language text from an input device (step 1). As an example, he/she should enter a natural language text "Move this to left below" (step 2).

Second, the system of the present invention generates operation instructions for the computer on the basis of the entered natural language text (step 3). The term "operation instructions" as used herein is construed to include execution commands for use in execution of the system. Step 3 includes the following substeps.

A morphological analysis, a disambiguation, and semantic analysis make a chained functions structure of the entered natural language text using a dictionary (step 11). Step 11 makes a chained functions structure, which is step 12 given in the figure, from the entered natural language text, "Move this to left below". The chained functions structure will be described later in detail. Step 11 also will be described in detail by reference to FIG. 6.

Changing the meaning structure is made on the basis of the chained functions structure using a meaning structure changing rules table 9 (step 13). The term "meaning structure changing rules" as used herein is interpreted to include rules for mapping partial structure of the chained functions structure made from the natural language text as shown in step 12 to templates for a language of operation instructions. An antecedent part of each rule has conditions for the respective partial structures of the chained functions structure, a consequent part (THEN part) of the rule has the template for the natural language text. This will be described in detail later. The term "meaning structure changing" denotes selecting the meaning structure changing rules which best match the partial structure of the chained functions structure generated from the natural language. That is, step 13 makes the template for the natural language text (step 14) up of the chained functions structure (step 12 as an example of data).

Third, instantiation is made using an instantiation data table 10 (step 15). The term "instantiation data" as used herein denote data on a table 10 which describes correspondence of concept of the natural language to location of actual data. Step 15 thus generates the language of operating instructions from the template for the language of operating instructions (step 14) using the instantiation data table 10.

Fourth, the language of operating instructions (step 4) is executed (step 5). An execution result is displayed on an output device (step 6).

Finally, contents of the instantiation data table 10 are updated on the basis of the contents displayed in step 6.

If the user inputs the next natural language text, the series of processes described above is repeated in accordance with the input.

Figure 2:
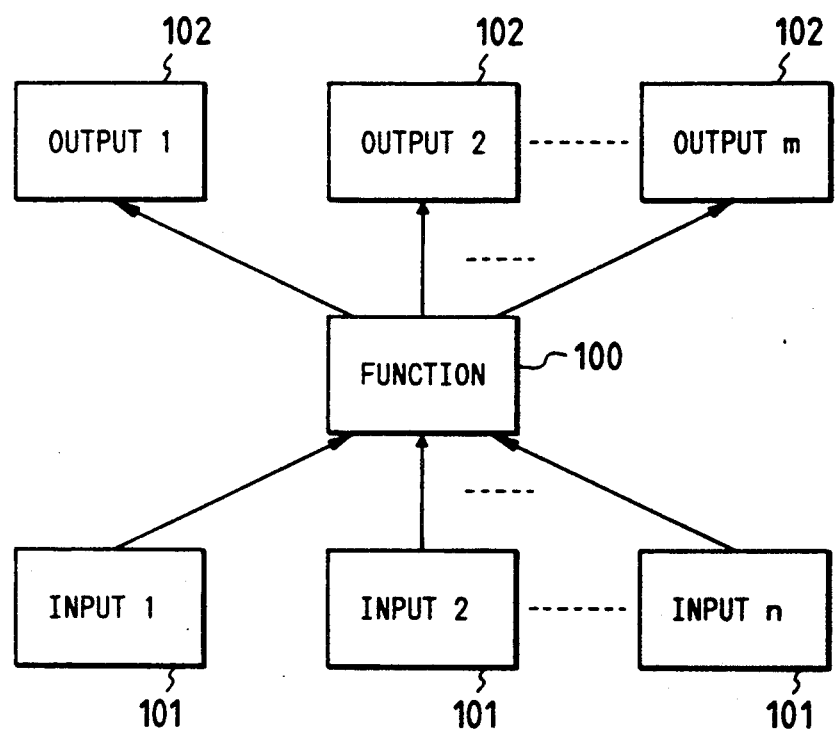
FIG. 2 is a tree structure illustrating a basic structure of a chained functions structure.

FIG. 2 shows one of basic structures of the chained functions structure represented in a tree structure. The chained functions structure as used herein is a network structure which represents concepts of the natural language as node relationships among concepts of the natural language as links (branches) among nodes. In general, therefore, the chained functions structure of the natural language contains numbers of the basic structures or may contain one basic structure, of course.

In the basic structure of the chained functions structure shown in FIG. 2, child nodes 101 of a node 100 representing a function are nodes (inputs 1 to n) for data and conditions input to the function 100. Parent nodes 102 of the node 100 representing the function are nodes (outputs 1 to m) for data and conditions output from the function. In the figure, the nodes are represented by blocks, and the relationships among the nodes are by the links with direction from the child nodes to parent nodes. The node representing the function may often be hereinafter referred to as the operation instruction node.

An expression that a result output of a function A is a datum or condition input to another function B can be represented in such a way that the node of result output to the function A is made as the node of datum or condition input to the function B. As another expression of the chained functions structure, we can use a graph structure such as a semantic network. This is equivalent as that.

For the sake of convenience of process, the actual chained functions structure may have a root node and a node for modifying or restricting another node.

Each of the nodes has the following information: (1) a node ID (identification datum) for identifying the node, (2) an information of link with other nodes, and (3) attributes for indicating use of the node itself. The node further may have the following information: (4) information for expression of the natural language, (5) information for dependent words, (6) information for a normal term of operation instructions, (7) information for meaning label for representing meanings of the those informations (data), (8) information for a relation between the natural language expression and a label for the meaning, and (9) information for cases of those informations (data) in the original natural language text. These types of information will be described in detail later.

The nodes can be classified by the attributes for their uses given in (3) above as follows. First nodes are system nodes that are used for processing, or managing or modifying, the tree structure. These, for example, include a node for representing the root, or for giving the "root" as an attribute. Second nodes are operation instruction nodes that represent functions for instructing applications to operate. These nodes give "functions" as attributes. Third nodes are condition and conclusion nodes that represent input conditions, input data, or output results for the operation instruction nodes. These nodes, for example, include nodes for representing tables, fields, and cell data for a data base. These are given "table", "field", and "cell data" as attributes, respectively. The other nodes include nodes for representing data for quotation with "quotation" given as an attribute, nodes for indirectly representing data with "pronoun" given as an attribute, nodes for making narrow searching space of the meaning structure changing rules used as information source to collect and recover declinable words and substantives from elliptic expressions with "condition" given as an attribute.

Figure 3:
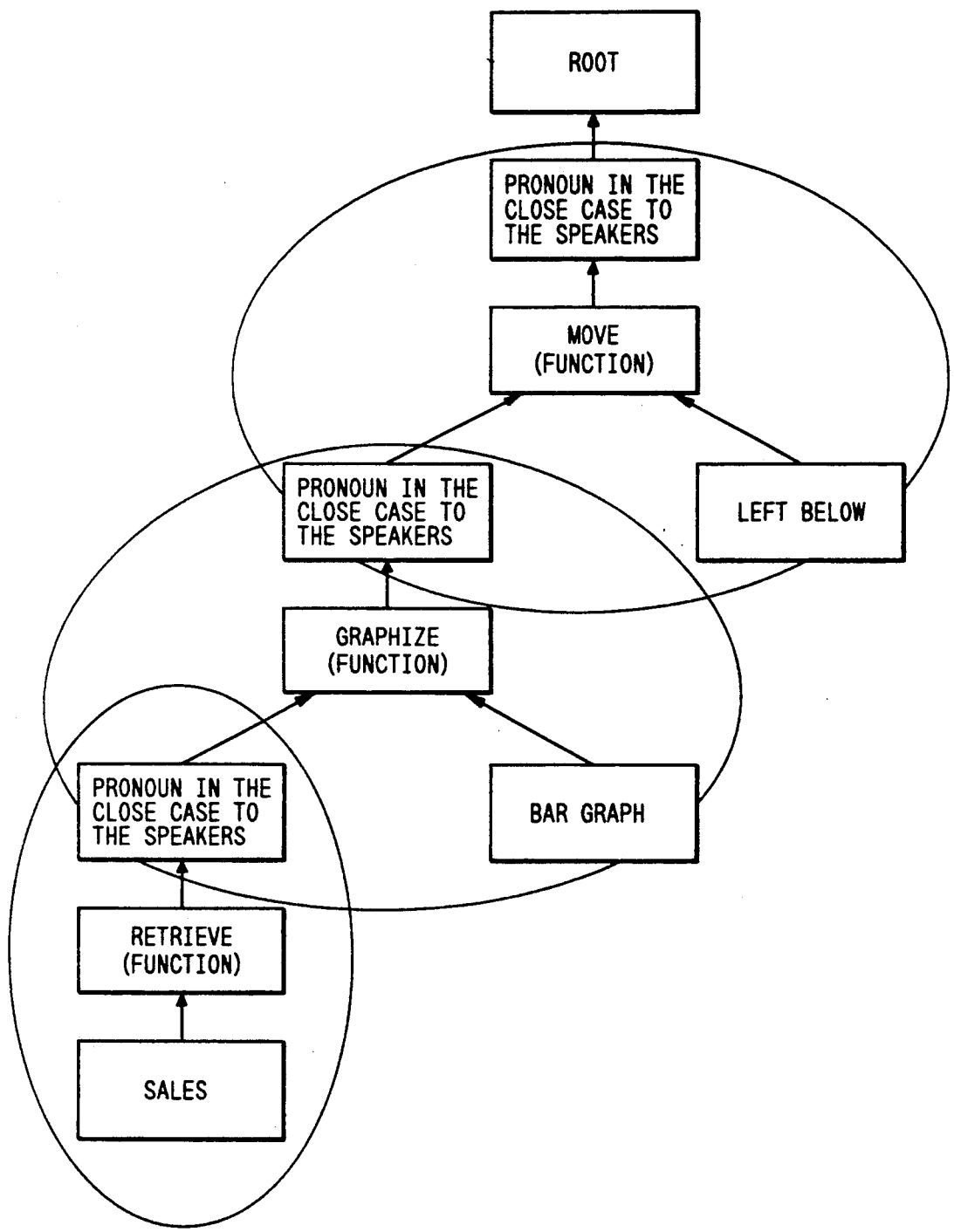
FIG. 3 is an example expressing a natural language text "Express the sales by a bar graph and move it to left below." in the chained functions structure.

FIG. 3 is an example of the chained functions structure which represents a statement of the natural language "Express the sales by a bar graph and move it to left below". In the figure are encircled their basic structures of the chained function structures. Detailed description will be given later.

Figure 4:
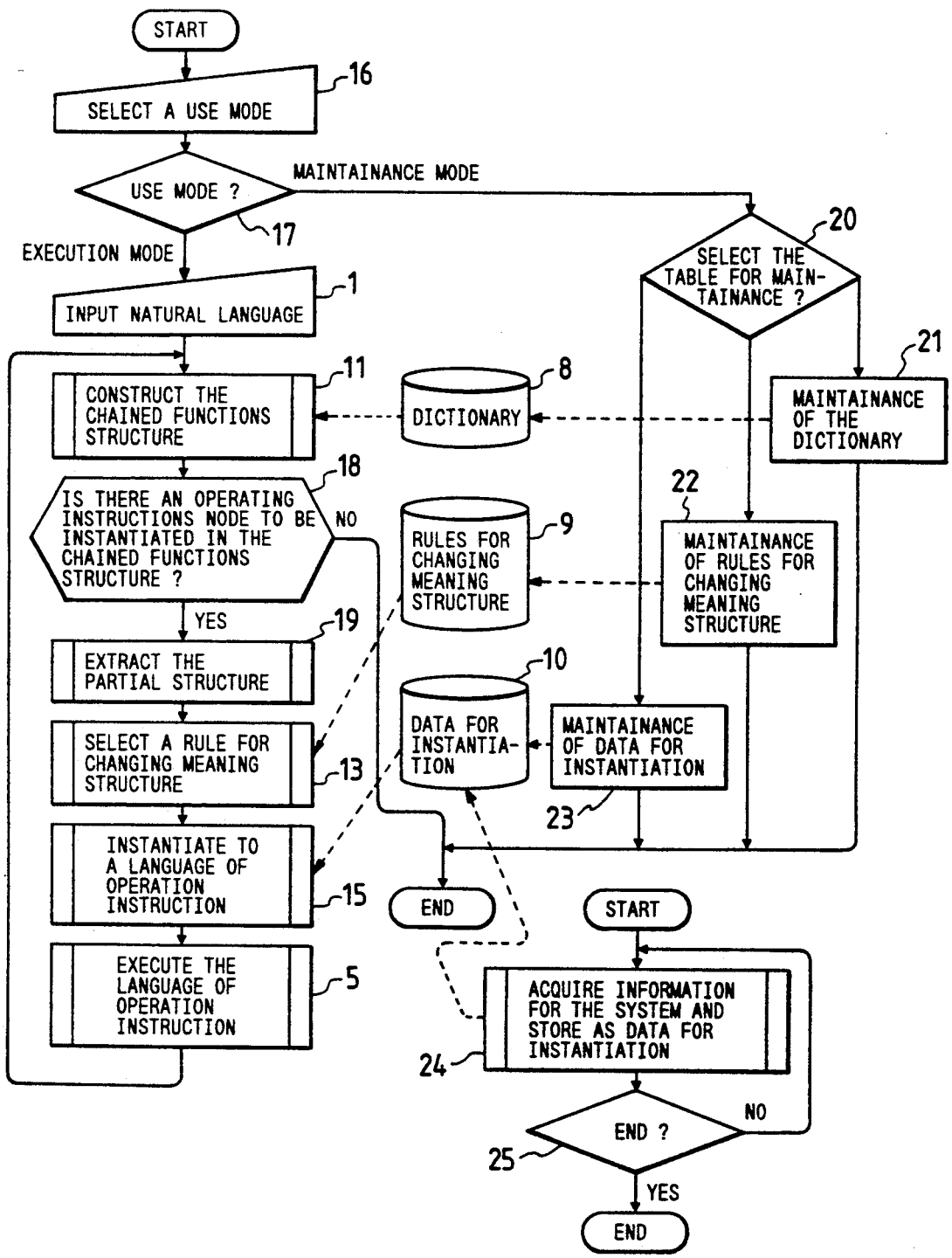
FIG. 4 is a detailed flow chart illustrating process procedures of the embodiment.

FIG. 4 is a detailed flow chart for process of the embodiment of the present invention.

A user should select a use mode of the system first (step 16). The use modes include an "execution mode" for interpreting and executing the natural language text and a "maintenance mode" for maintaining data for the execution.

The process is branched depending on the use mode selected (step 17). It is branched to step 1 for the "execution mode" or to step 20 for the "maintenance mode".

In the "execution mode", the user should enter the natural language by typing on a keyboard (step 1). The natural language to be entered should be of natural language character string in a text format. Easy alternative entering methods include selection from among numbers of statements arranged in advance, entering hand-written characters, entering by speech recognition, and OCR (optical character recognition).

In turn, the chained functions structure is made up of the entered natural language character string using a dictionary 8 (step 11).

Next, a check is made to determine whether the constructed chained functions structure contains operation instruction nodes which have not been processed (step 18). If any, process is branched to step 19. If not, the process ends. Or, it may be branched to the input to step 16 to select the other mode. Alternatively, it may be branched to the input to step 1 to analyze another natural language text. The term "operation instruction node" as used herein denotes a node which is featured in particularly strong functional attribute, that is, corresponds to the natural language having strong declinable character, in the chained functions structure. A simple way to check whether it is strong in the functional attribute is to check through the natural languages corresponding to the node, provided that the strengths of their functional attributes have been cataloged in advance.

In turn, extraction is made of the partial structure of the chained functions structure in connection with the operation instruction node pointed out at step 18 (step 19). The partial structure of the chained functions structure in connection with the operation instruction node is to be a structure which most contains nodes with respect to the operation instruction node as the nodes are successively found through the link from that node to expand the structure. But does not contain another operation instruction node or root node.

Next, a proper meaning structure changing rule is selected from the meaning structure changing rules on the basis of the partial structure of the chained functions structure extracted at step 19 (step 13).

The template for the operation instructions language which is a part of consequent of the meaning structure changing rules selected at step 13 is converted to actual operation instructions language on the basis of the instantiation data table 10 (step 15). The operation instructions language obtained here is the operation instructions language for application or the operation instructions language to send data to the chained functions structure itself.

In turn, the operation instructions language for application obtained at step 15 is executed (step 5).

The dictionary 8 is a table containing at least morphological information (expression, inflection, etc.), syntactic information (modifying, case, etc.), and semantic information (strengths of functional information, data information, and condition information, a normal term of operation instructions, meaning label, etc.) for any of the morphemes or similar components of the natural language.

The "a normal term of operation instructions" is a concept representing the function of the morpheme, particularly of the declinable word. The "meaning label" is a concept representing the data or conditions of the morpheme, particularly of the substantive. The semantic network having the meaning labels connected therebetween properly can represent a world concerned.

If the natural language is entered by speech recognition at step 1, this can be made by having the dictionary containing the phonemic information and phonologic information together.

The meaning structure changing rules table 9 is represented in table having the meaning structure changing rules registered to convert the partial structure of chained functions structure to operation instructions language.

The instantiation data table 10, as described before, is a table which describes correspondence of the concept of the label for the meaning to location of actual data.

If the "maintenance node" is selected at step 17, a table for maintenance is selected (step 20). The tables which the user can maintain include the dictionary 8, the meaning structure changing rules, and the instantiation data table 10. The process is branched to step 21, 22, or 23 depending on the selection of table (step 21, 22, or 23).

Any of steps 21, 22, and 23 can execute editor functions, including creation, addition, deletion, and updating any data n the table. The data expression for the user may differ from the one stored. Explanation of the editor is ignored here as it has been described in detail in many documents.

There is a process different from the one described so far. That is a series of process steps that can be call the task or program to execute the following steps 24 and 25. These steps are provided to allow a display history to be stored in the instantiation data table 10 even if the process described above is not started.

First, information of the display status given by the computer is acquired and stored in the instantiation data table 10 (step 24).

Then, the user has an inquiry whether step 24 is to end (step 25). If it is continued, it is branched to step 24 again. It is desirable to branch to step 24 as long as no interruptions are made to halt the execution by the user.

Whenever instantiation is made to the operation instructions language by the process mentioned above, the instantiation data table 10 is updated to the latest. This update allows properly analyzing pronouns and similar words as a feature of the present invention. In addition, the latest instantiation data table 10 can be used to analyze even if interpretation of a statement is made different depending on situation. The reasons for these will be apparent by the explanation given later.

Figure 5:
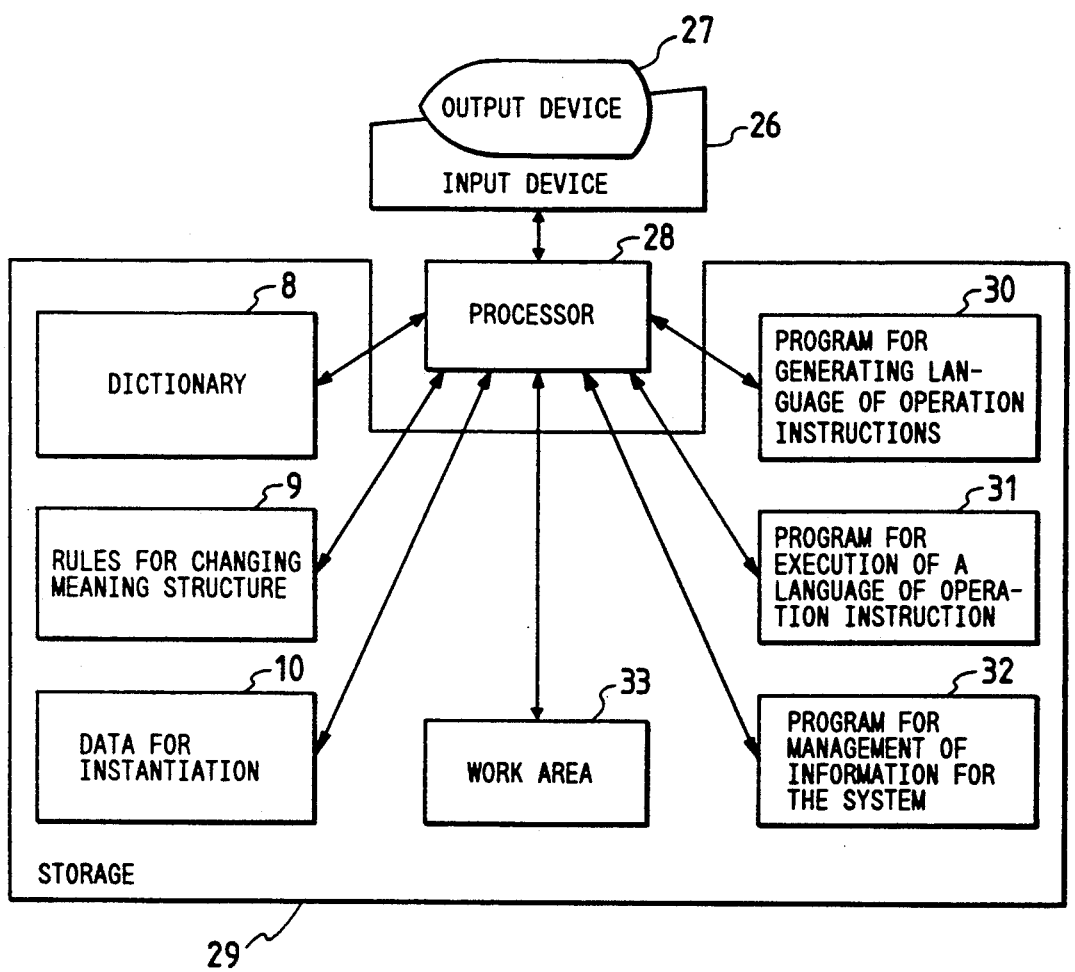
FIG. 5 is an example of system configurations for accomplishing the embodiment.

FIG. 5 is a system configuration for the embodiment of the present invention. The system comprises a processor 28 and a storage 29, an input device 26, and an output device 27 which are connected thereto. The storage 29 has an operation instruction language generating program 30, an operation instruction language execution program 31, a system information managing program 32 for managing information for the system, a work area, the dictionary 8, the meaning structure changing rules, and the instantiation data table 10 built therein. The system, as can be seen from FIG. 5 and the description made so far, can be made up of an electronic computer. This is not limited to a large scale computer, but may be a work station or personal computer if these can execute the operation instruction language execution program 31 having a process description corresponding to the operation instructions language. Notwithstanding, the system may be of distributed type which can execute the operation instruction language execution program 31 and is connected with a computer for executing the operation instruction language generating program 30. Connection between the computers may be functionally made through a storage. But, this is not preferable in view of features of the present invention.

The operation instruction language generating program 30 is a program for executing a series of processes for the "execution mode" and the "maintenance mode" beginning with step 16 shown in FIG. 4. Step 5 in FIG. 4 may be made by executing a process corresponding to the operation instructions language. But, it may be made by executing a process (start) which prompts an actually executing process (task or program) to start execution in view of a program composition (development efficiency and execution efficiency). It should be noted that in the operation instruction language generating program 30, step 5 means start of its execution, but not means end of its execution.

The operation instruction language execution program 31 is a program for executing or continuing execution (step 5) of actual operation instructions language. It may be composed in a fashion in which a multiple of operation instructions language can be executed by the respective processes using a multiprocess (multitasking).

The system information managing program 32 for managing the system information is a program for executing steps 24 and 25 in FIG. 4.

FIG. 6 is a detailed flow chart for construction process (step 11 in FIG. 1 or 4) of the chained functions structure in the embodiment of the present invention.

First, the natural language character string of text format entered at step 1 is morphologically analyzed to divide into morphemes using the dictionary 8 (step 1110).

The morphological analysis (step 1110) divides the entered natural language text into morphemes on the basis of the information of morpheme, syntax, and meaning in the dictionary 8. Note that a phrase involving a definite meaning may be regarded as one morpheme for the sake of convenience.

Also, note that the conventional morphological analysis may be used at step 1110.

Then, disambiguation is executed to restrict the scope of the meaning of each of the morphemes divided at step 1110 (step 1111).

In the disambiguation (step 1111), the scope of the meaning is restricted using features of the syntax, for example, the subject-predicate relation and modifying relation (step 1102).

The scope of the meaning is restricted using co-occurrence (step 1103). Information of the co-occurrence may be separately provided as co-occurrence dictionary, or may be stored in the dictionary. The disambiguation using the co-occurrence is a method that if "a good of 500 yen" is analyzed, for example, the "good" prompts the meaning of "500 yen" to be limited to "sales price".

An expressive position of the entered natural language, or particularly an expressively adjacent morpheme or a clause, is restricted in the scope of the meaning as it is regarded close in the meaning (step 1104).

Further, the scope of the meaning is restricted with idiomatic use of words in the domain concerned made to have priority (step 1105).

There may be easily used an alternative disambiguation that evaluation is repeated from step 1102 whenever meaning of each morpheme is determined to a certain degree from step 1102 to 1105. There also may be readily used still another alternative disambiguation that steps 1102 to 1105 are exchanged depending on application.

In turn, semantic analysis is executed to build up the chained functions structure with respect to the operation instruction node on the basis of the meanings of the morphemes limited at the disambiguation processing (step 1111) and the syntactic information of the morphemes (step 1112).

In the semantic analysis (step 1112), a prototype for the chained functions structure is constructed first (step 1106). That is, the natural language which has been divided into the phonemes and limited in the meanings n the processes up to step 1111 has a tree structure made with its content words, punctuation symbols, and quotation marks treated as nodes and with the word at the end of the sentence put at the root of tree structure and the word at the beginning put at the end (leaf of the tree structure). The tree structure is a tree structure having one parent node and one child node except that the nodes are at either of the ends.

In turn, analysis is made on special expressions in the natural language (step 1107). The meaning structure changing rules may be used for the analysis as information source if necessary. Processing the special expressions in the natural language will be described later (FIGS. 7, 8, and 9).

In turn, the chained functions structure is built up (step 1108). The tree structure obtained up to step 1107 is checked in a post-order and depth-first search, description of which is ignored as well known as one of tree structure search methods, to find out an operation instruction node. The nodes which have been passed until the operation instruction node is found are defined child nodes. A node for substitution of a result of the operation instruction is supplemented between the operation instruction node and its parent node if necessary.

If there are two or more operation instruction nodes in the chained functions structure, then searching of these is repeated using that chained functions structure or the chained functions structure rebuilt on the basis of that chained functions structure. The searching is made as the operation instruction nodes used for the meaning structure changing and the child nodes of the operation instruction nodes and the following nodes are omitted.

FIGS. 7, 8, and 9 are examples of the processes of the special expressions in the natural language. Any of the processes can be omitted for decrease of the analysis accuracy or analysis performance (speed).

In this embodiment of the present invention, checking is made whether processes from 1107(A) to 1107(G) in FIGS. 7, 8, and 9 should be executed or not. If so, any of them is executed. And, it is executed repeatedly any time if its conditions are met. It is regarded preferable to proceed in the order of 1107(A) to 1107(G). But, this order may be changed. In this embodiment, the seven processes 1107(A) to 1107(G) have been described as the examples of special expressions in the natural language. Processes of other special expressions in the natural language may be added for analyzing the meaning.

In FIGS. 7, 8, and 9, the process names (types of process) are arranged to correspond to the examples of the natural language text and the statuses of the nodes before and after the processes.

The following describes the processes of the special expressions in the natural language. The term "delete" as used herein denotes isolation of a node from the prototype of the chained functions structure and reconnection of its parent node with its child node unless otherwise specified.

Process 1107(A) is a process of approving the quotation. If the prototype of the chained functions structure contains a phrase to be quoted, or words enclosed by quotation marks, for example, "taking a lesson from the past", these words are arranged as one node, and this node is made to have the "quotation" as an attribute. The terms "taking a lesson from the past" are expressed by three nodes before process in FIG. 7, they are expressed by one node after process. Its natural language expression is made "Taking a lesson from the past", and the attribute is made "quotation". Note that if the prototype of the chained functions structure contains a node expressing only the quotation marks, it is deleted.

Process 1107(B) is a process of deleting undefined word. If the prototype of the chained functions structure contains a node the meaning of which has not been undefined (undefined word), particularly a node corresponding to a word which does not exist in the dictionary, then the node is deleted. Contents in the blocks in the figure need hardly be explained.

Process 1107(C) is a process of combining numerical values with units. If the prototype of the chained functions structure contains a value and a unit which are adjacent to each other, they are arranged to one node, and this node is made to have "numerical value plus value" as attribute. In the figure the numerical value "1989" and the unit "year" are represented as one node. Its meaning label is "year". Illustration of the attribute is ignored.

Process 1107(D) is a process of analyzing punctuation symbols. If the prototype of the chained functions structure contains a node having a punctuation expression, then the original natural language text is regarded an expression equivalent to a compound sentence, and the nodes below are moved right below the root node. The process is described below with reference to FIG. 8. The prototype of the chained functions structure for the natural language text "calculate, and print.", as shown in the figure, is expressed by four nodes corresponding to the respective natural language notations, including "calculate", ",", "print", and ".", toward the root node. In the process, the nodes corresponding to "," and "." are ignored, and the nodes corresponding to "calculate" and "print" are moved right below the node the attribute of which is root (see the after-process column in the figure). If there are nodes having only punctuation symbols express therein, those are deleted.

Process 1107(E) is a process of analyzing a comparative expression combined with numerical values, a partial negation, and an expression of starting and ending points. If the prototype of the chained functions structure contains contiguous expressions of numerical value combined comparison, or states having expressions being contiguous, they are arranged to one node, and this node is made to have the "numerical value plus comparative expression" as attribute.

If it has a partial negation, then a node of partial negation and a node to be negated are arranged to one node, and this node is made to have the "partial negation" as attribute.

If the prototype contains an expression of starting or ending point, then they are arranged to one node, and this node is made to have the "expression of starting point" or the "expression of ending point" as attribute. FIG. 8 shows examples of the expressions of starting and ending points. The prototype of the chained functions structure of a natural language text "from the 6th month to the 7th month", as shown in the figure, are expressed by three nodes corresponding to it. Analysis is made on the basis of the natural language text "from" that "the 6th month" is the starting point. As the starting point exists, it is judged that the ending point exists, or it is analyzed that the ending point is "the 7th month," assuming that a "till" expressing the ending point is omitted. That is, the node corresponding to the natural language text "from" is deleted as a period is defined from the starting point "the 6th month" and the ending point "the 7th month" and at the same time, "more than" and "less than" are given to the nodes corresponding to "the 6th month" and "the 7th month" as an information indicating the relation between natural language expression and a label for the meaning.

Process 1107(F) is a process of collecting and recovering the substantives and declinable words from omission. If the prototype of the chained functions structure has no operation instruction node which should exist as inferred from contents of the other nodes, the operation instruction node assumed as omitted is collected and recovered. If the prototype of the chained functions structure has no node other than the operation instruction node which should exist as inferred from contents of the other nodes, the node other than the operation instruction node assumed as omitted is collected and recovered. Note that the information used for inferring in process 1107(F) may be the information described in the antecedent part of the meaning structure changing rules.

The example columns of process 1107(F) show that words "bar graph" are entered by an input device 26, while an output device 27 displays some data in a chart form as an example. In this case, the chained functions structure is expressed in a way that the entered natural language "bar graph" has a natural language expression of the "bar graph", and the attribute is the "condition". On the other hand, collection and recovery are made of the node of the "graphize" and the attribute "function" and the node of the attribute "pronoun" and the meaning label "pronoun in the close case to the speakers" of the meaning indicating the data to be shown on the output device 27. The latter node is "this" as it is expressed in the natural language.

Process 1107(G) is a process of analyzing the logical relation expression. If the prototype of the chained functions structure has a logical-AND expression or a logical-OR expression, detection is made of a set of nodes or node group (hereinafter represented by the "node group") which are to be logically combined with themselves. Copy is made of structures other than the one set of logically combined node group among structures below the operation instruction node governing the set of detected node group, or leaf nodes of the tree structure looked from the operation instruction node, to generate. In FIG. 9, a node having the normal term of operation instructions of "retrieve" and the attribute of "function" is copied. These two structures that are the original structure and the structure generated by copy are branched and connected at the original parent node which is the operation instruction node, and the respective node groups are allocated at the position of structure where the set of logically combined node group was present. Description of the analysis given in figure is ignored as this will be easily understood. If there are nodes expressing the logical-AND or the logical-OR alone, it is deleted.

Figure 10:
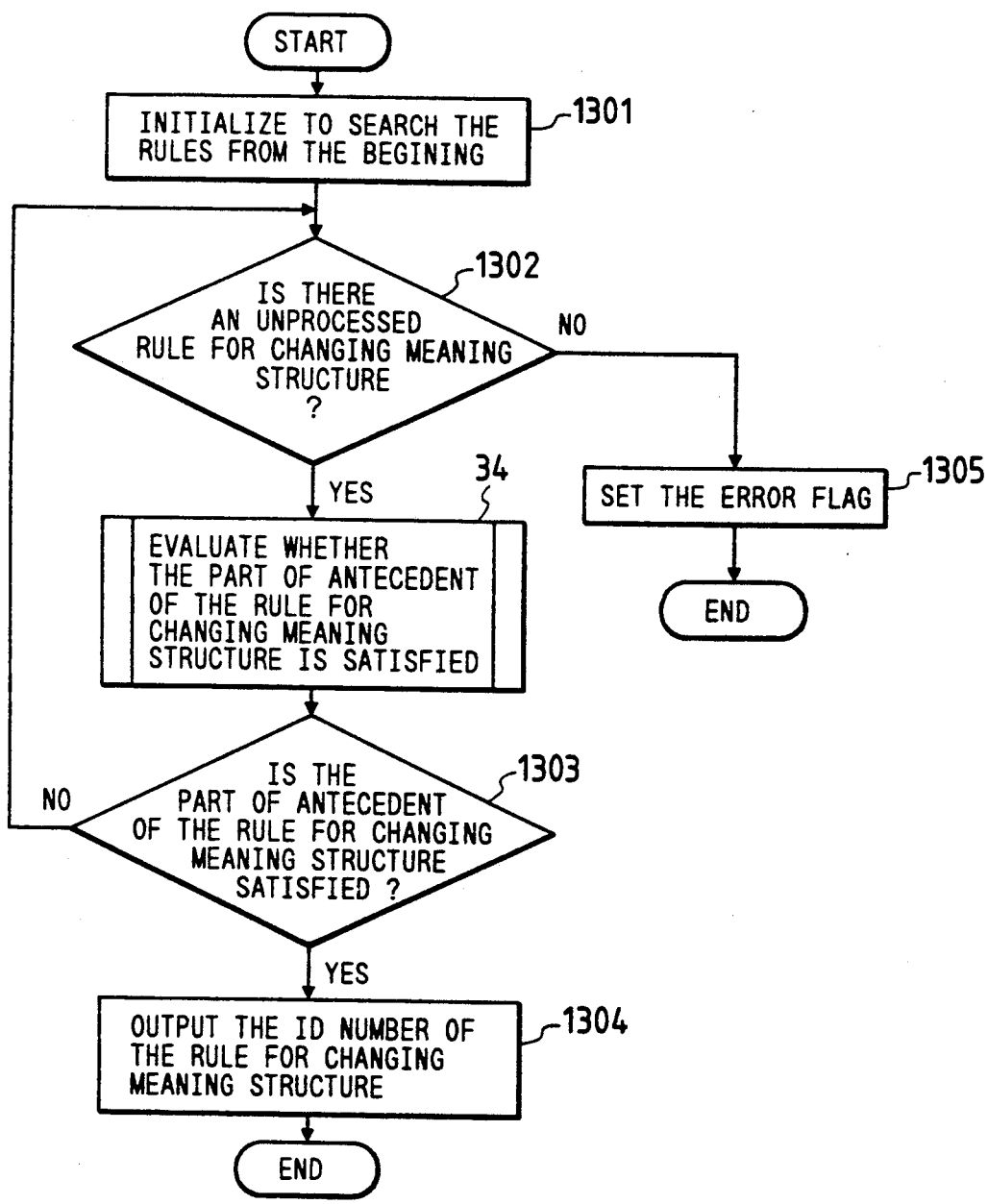
FIG. 10 is a detailed flow chart for a meaning structure changing rules selection process (step 13) in FIG. 4.

FIG. 10 is a detailed flow chart for the process (step 13) of the meaning structure changing.

The process of meaning structure changing, as described by reference to FIG. 4, is a process of selecting a rule corresponding to each of the partial structures of the extracted chained functions structure from the meaning structure changing rules table 9.

First, parameters are initialized to search the meaning structure changing rules in the meaning structure changing rules table 9 from the beginning. (step 1301). An example of the meaning structure changing rules table 9 is shown in FIGS. 14 and 15. Initializing the parameters is to set pointers, for example, so that the rules can be searched for in the ascending order of the rule ID numbers given in FIG. 14 beginning with the rule "001".

In turn, check is made as to determine whether unprocessed (unsearched) meaning structure changing rules exist in the meaning structure changing rules table 9 (step 1302). If there is no meaning structure changing rules to be processed in the meaning structure changing rules table 9, then process is branched to step 1305.

Check is made as to whether the partial structure of the chained functions structure meets the antecedent part 36 of the meaning structure changing rules searched at step 1302 (step 34). The step 34 will be described in detail later.

If the partial structure meets contents of the antecedent part of the meaning structure changing rules at step 34, then process is branched to step 1304. If not, it is branched to step 1302 (step 1303).

When the partial structure meets contents of the antecedent part of the meaning structure changing rules at step 34, the rule ID number 35 of the meaning structure changing rules is obtained (step 1304). The rule ID number 35 will be used in a process afterward.

If there is no meaning structure changing rules corresponding to the meaning structure changing rules table 9 at step 1302 when search is made for all the meaning structure changing rules, then an error flag is set (step 1305). With the error flag set, the corresponding error process is executed separately in the example, instead, the error process may be executed at step 1305.

Figure 11:
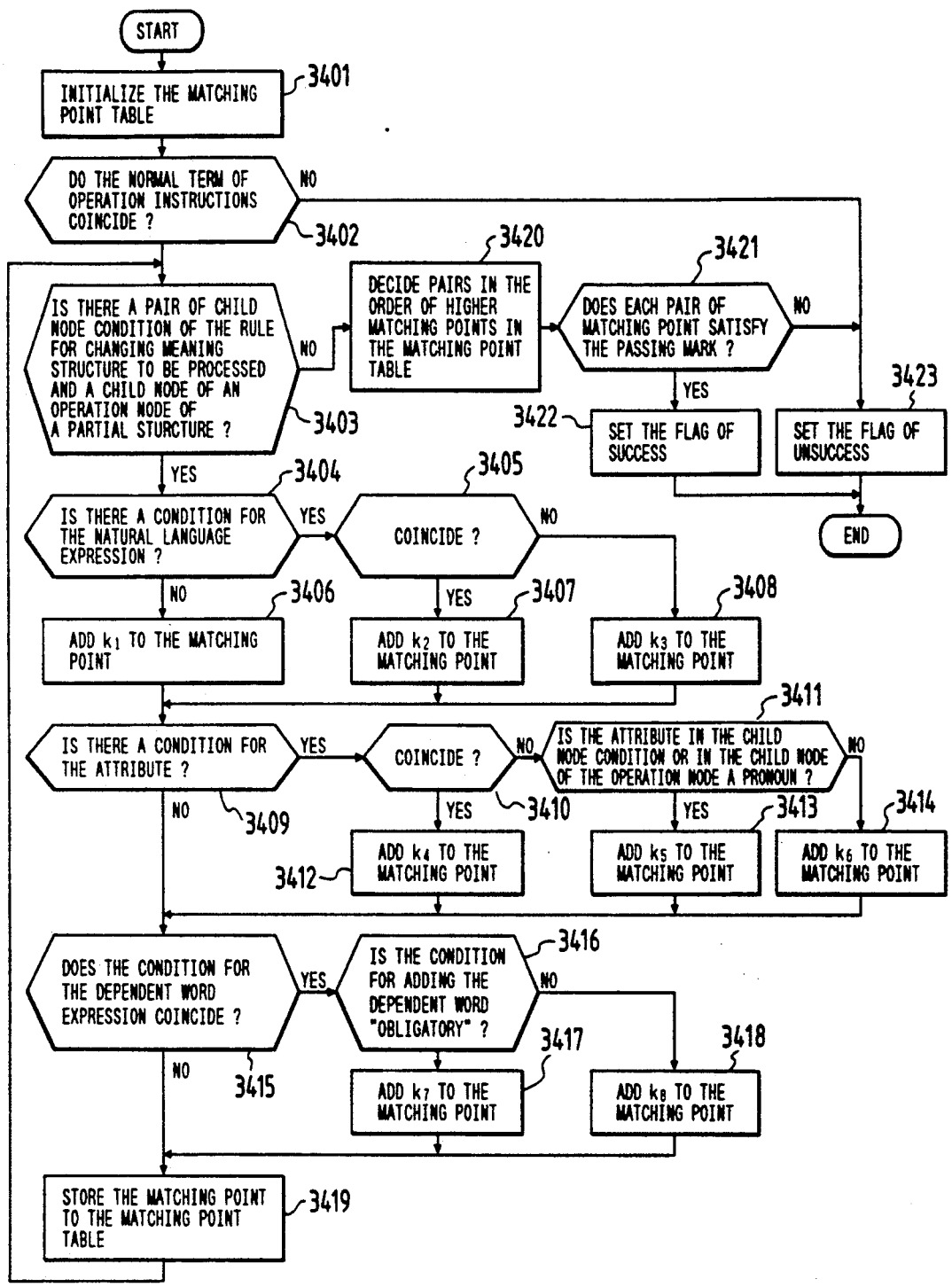
FIG. 11 is a detailed flow chart for a meaning structure changing rules matching point evaluation (step 34) in FIG. 10.

FIG. 11 is a detailed flow chart for a process of evaluating the matching point of the meaning structure changing rules outlined above by reference to FIG. 10, that is, a process of checking whether the partial structure of the chained functions structure derived from the natural language text meets the antecedent part 36 of the searched meaning structure changing rules.

First, the matching point table is initialized (step 3401). The matching point table can be expressed in a two-dimensional matrix having first elements made of the node for the data and conditions extracted at step 19 and having second elements made of the child node condition 42 of the natural language antecedent part 38 of the meaning structure changing rules (FIG. 14) selected at step 1302. The matching point table has matching point of the first and second elements stored therein. The matching point as used herein is a numerical value indicating to what a degree the nodes (first elements) of the data and conditions of the chained functions structure entered from the natural language text meet the child node conditions (second elements) of the natural language antecedent part of the meaning structure changing rules concerned. The matching point is obtained in the following procedures.

Checking is made as to whether the normal term of operation instructions of the operation instruction node extracted at step 19 coincides with the normal term of operation instructions 40 of the meaning structure changing rules selected at step 1302 (step 3402). If so, process is branched to step 3403. If not, it is branched to step 3423.

When the normal term of operation instructions coincides at step 3402, judgment is made as to whether there is a pair of any of the nodes of the data or conditions extracted at step 19 with any of the child node conditions 42 of the natural language antecedent part 38 of the meaning structure changing rules (step 3403). If not at step 3403, then process is branched to step 3420.

Further, at step 3403, the matching points used below are initialized. An initial value $k_0$ of the matching points should be preferably 0.

In turn, in the pairs detected at step 3403, check is made as to whether the condition for the natural language expression is contained in the child node conditions 42 of the part of antecedent in natural language 38 of the meaning structure changing rules (step 3404). If so, process is branched to step 3405. If not, the matching point has a value $k_1$ added thereto (step 3406). If the natural language expression condition is contained, check is made as to whether the natural language expression coincides with the natural language expression condition (step 3405).

If so, the matching point has a value $k_2$ added thereto (step 3407). If not, the matching point has a value $k_3$ added thereto (step 3408). The process from step 3406 to 3408, as described above, is a process that the initial value $k_0$ of the matching point has the weight $k_1$, $k_2$, or $k_3$ added thereto depending on whether the condition for the natural language expression is present or absent.

In turn, in the pairs detected at step 3403, check is made as to whether the attribute condition is contained n the child node conditions 42 of the part of antecedent in natural language 38 of the meaning structure changing rules (step 3409). If so, process is branched to step 3410. If not, process is branched to step 3415.

When the attribute condition is contained at step 3409, in the pairs detected at step 3403, check is made as to whether the attribute of the node coincides with the attribute condition (step 3410). If so, the matching point has a value $k_4$ added thereto. (step i ) 3412). If not, process is branched to step 3411. When the attribute condition does not coincide at step 3410, in the pairs detected at step 3403, check is made as to whether at least one of the attribute of the node and the attribute condition of the meaning structure changing rules is "pronoun" (step 3411). If so, the matching point has a value $k_5$ added thereto (step 3413). If not, the matching point has a value $k_6$ added thereto (step 3414). The process from step 3412 to 3414, as described above, is a process that the matching point obtained on the basis of the natural language expression condition has the weight $k_4$, $k_5$, or $k_6$ further added thereto depending on whether the attribute condition is present or absent.

In the pairs detected at 3403, check is made as to whether the dependent word of the operation instructions language coincides with the dependent word expression condition contained in the child node conditions 42 of the natural language antecedent part 38 of meaning structure changing rules (step 3415). If so, process is branched to step 3416. If not, process is branched to step 3419.

When the dependent word expression condition coincides at step 3415, in the pairs detected at step 3403, check is made as to whether additional conditions to the dependent word is "obligatory" (step 3416). If so, the matching point has a value $k_7$ added thereto. (step 3417). If not, the matching point has a value $k_8$ added thereto (step 3418). The process of step 3417 and 3418, as described above, is a process that the matching point obtained already has the weight $k_7$ or $k_8$ further added thereto depending on the situation of the additional condition to the dependent word.

Then, the present matching point is stored in a proper position in the matching point table (step 3419).

Now, if there become no unprocessed pairs from steps 3403 to 3419 among the pairs of any of the nodes of the data or conditions extracted at step 19 and the child node conditions 42 of the natural language antecedent part 38 of the meaning structure changing rules, then the pairs of the nodes of the data or conditions and the child node conditions 42 of the natural language antecedent part 38 of the meaning structure changing rules are arranged in the order of high matching point in the matching point table (step 3420). However, the elements already paired cannot be used as elements with other pairs, including the already paired nodes of the data or conditions extracted at step 19 and the already paired child node conditions of the natural language antecedent part of the meaning structure changing rules.

In turn, check is made as to whether the pairs decided at step 3420 conform to the meaning structure changing rules selected at step 1302 (step 3421). If the matching points of the pairs decided at step 3420 are all positive when $k_0$ is 0, they meet the meaning structure changing rules according to calculation of the matching points. Then, a flag of "success" is set to use at step 1303 (step 3422). If not, a flag of "unsuccess" is set to use at step 1303 (step 3423).

The weights described above in the course of obtaining the matching points should preferably meet the following restrictions, particularly restrictions (1) through (6).

(1) No inequality of the natural language expression conditions are allowed.

$$-k_3 > k_1 + k_2 + k_4 + k_5 + k_7 + k_8.$$

(2) No inequality of the attribute conditions are allowed.

$$-k_6 > k_1 + k_2 + k_4 + k_5 + k_7 + k_8.$$

(3) Equality of the natural language expression conditions is prior to any of the other equality conditions, such as the attribute conditions.

$$k_2 > \max(k_1, k_4, k_5, k_7, k_8).$$

(4) There may be matching in the pair detected at step 3403 even if there is no natural language expression condition.

$$k_1 > k_0.$$

(5) Equality of the attribute condition is prior to the case one attribute is "pronoun" $k_4 > k_5$.

(6) If the additional condition to the dependent word is "obligatory", it is prior to that it is not so. $k_7 > k_8$.

(7) The conditions of the dependent word are prior to those of the attributes.

$$\min(k_7, k_7) > \max(k_4, k_5).$$

As an example, the following shows a preferable combination of the weights which meet the restrictions mentioned above.

$k_0 = 0$, $k_1 = 1$, $k_2 = 32$, $k_3 = -64$, $k_4 = 4$, $k_5 = 2$, $k_6 = -64$, $k_7 = 16$, $k_8 = 8$.

Figure 12:
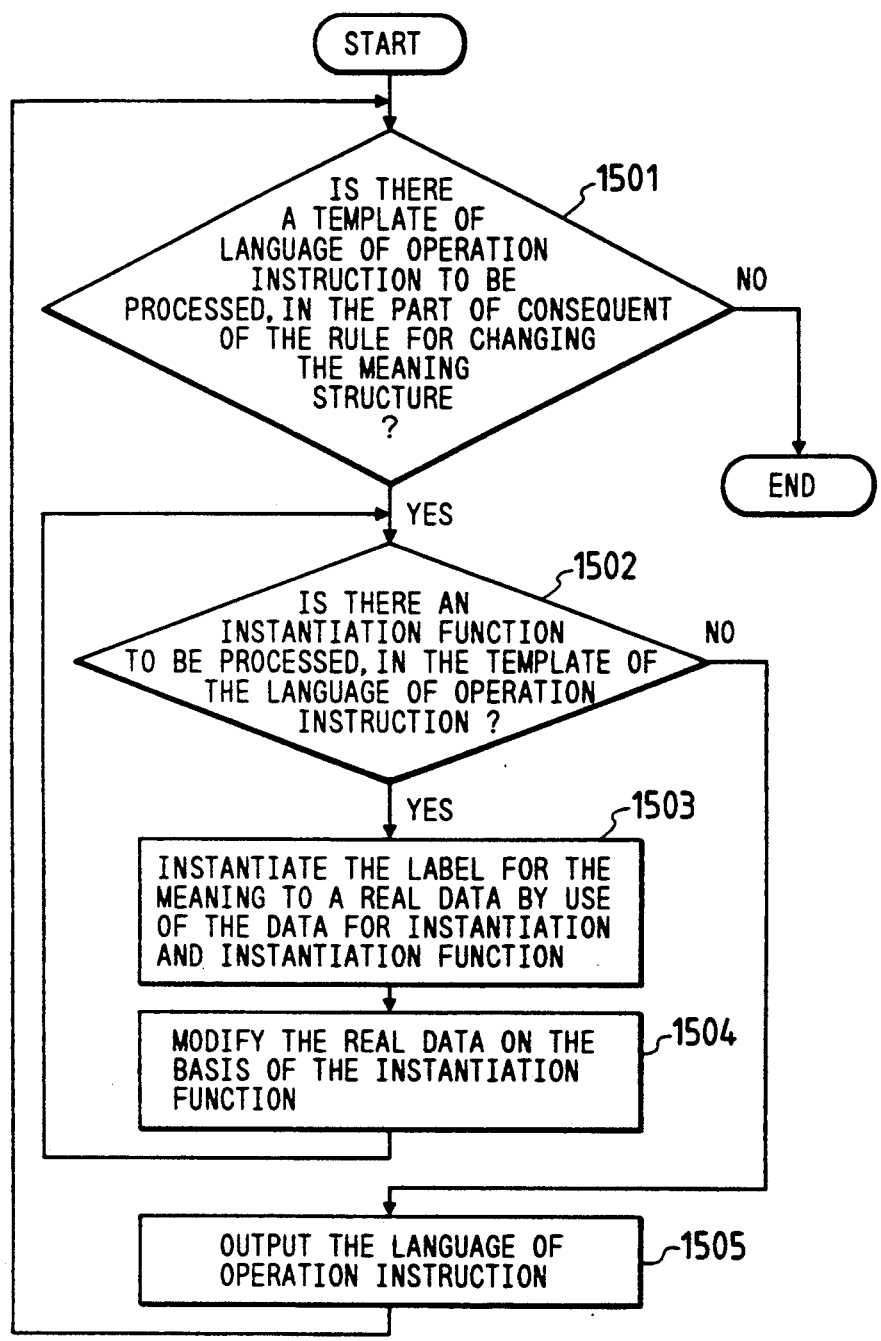
FIG. 12 is a detailed flow chart for instantiation to the operation instructions language (step 15) in FIG. 4.

FIG. 12 is a detailed flow chart for the instantiation process to the operation instructions language (step 15) in the embodiment of the present invention.

First, the templates of the unprocessed operation instructions language are taken out in sequence from the meaning structure changing rules selected at step 13 (step 1501). If there is no proper template of the operation instructions language in the meaning structure changing rules selected at step 13, then the instantiation process to the operation instructions language (step 15) ends.

Then, instantiation functions are taken out of the templates of the operation instructions language taken out at step 1501 (step 1502). If there is no proper instantiation function in the templates of the operation instructions language, then the template itself of the operation instructions language becomes the language of the operation instructions and the process is branched to step 1505.

The term "instantiation function" as used herein denotes a function for the process that the data in the instantiation data table 10 are looked to modify the character string. The instantiation function is accomplished by a functional process routine in a program. Some examples of the instantiation functions are described below.

The instantiation functions used in the embodiment include "Table", "Field," "Place", and "Newname". The number of instantiation functions can be increased as necessary.

The instantiation function "Table" outputs data stored in Table column 64 in the instantiation data table 10 as made to correspond to the meaning labels.

The instantiation function "Field" outputs data stored in Field column 65 in the instantiation data table 10 as made to correspond to the meaning labels.

The instantiation function "Place" outputs data stored in Place column 66 in the instantiation data table 10 as made to correspond to the meaning labels.

The instantiation function "Newname" generates and outputs new names which have not been used in the current system.

The instantiation functions mentioned above also include a process of insertion of proper delimiters, such as a space, in the character string. Examples of the instantiation functions added as needed are as follows. It may be required to modify the character string depending on a specific application. For this case, there are an instantiation function for converting the character string and inserting a conjunction, such as "and," in the converted character string and an instantiation function for looking the data in the instantiation data table 10 and making reconversion.

In turn, the meaning label is converted to real data according to the instantiation function taken out at step 1502 and the data in the instantiation data table 10 (step 1503).

In turn, modification is made on the real data (particularly, the character string) to be contained in the templates of the operation instructions language which have been converted according to the instantiation function at step 1503 (step 1504).

In turn, the operation instructions language obtained at step 1502 is output for use at step 5 (step 1505).

FIG. 13 is a detailed flow chart for a process of acquiring the system information (step 24) in the embodiment of the present invention, particularly the information already output to the display.

First, the instantiation data table 10 is initialized (step 2401). However, it is preferable not to initialize the data of history.

In turn, check is made as to whether the information to be processed is displayed (step 2402). If any, process is branched to step 2403. If not, the process (step 24) ends.

In turn, check is made as to whether the object selected at step 2402 is either table or graph (step 2403). If it is either table or graph, then process is branched to step 2404. If not, it is branched to step 2405.

As for the table or graph selected at step 2403, relationship between the table or graph and fields contained and displayed in it is stored into the instantiation data table 10 (step 2404). The fields in the table is, for example, an item name described in it; the field in the graph is an item name describing the graph itself or the axes.

In turn, the information of display(ing) positions of the object selected at step 2402 is stored in the instantiation data table 10 (step 2405).

In turn, relationship between the object selected at 2402 and the meaning label for the operating object of the operation history in the instantiation data table 10 is updated and stored in the instantiation data table 10 (step 2406). The meaning label for the operating object of the operation history denotes a meaning label corresponding to a concept such as "the former" in the natural language.

The above description with reference to FIG. 13 was made as if the information displayed on the screen is read. In actual operation, we can use the information stored in the storage 29 for the display output information and its output managing information, such as output positions, colors, output particulars. This need hardly be said for persons in the art.

FIGS. 14 and 15 are an example of the meaning structure changing rules which has been quoted and partly described. Note that FIG. 15 is continued from FIG. 14.

The meaning structure changing rules is composed of the rule ID number 35 as the identifier of the meaning structure changing rules, the antecedent part 36, and the consequent part 37 for each of the meaning structure changing rules. The antecedent part 36 comprises of the natural language antecedent part 38 and an application antecedent part 39. The natural language antecedent part 38 comprises a normal term of operation instructions 40, an order of priority 41, proper number (n) of the child node condition 42. Each of the child node conditions 42 comprises a name of formal variable identifier, the natural language expression condition, the attribute condition, the dependent word expression condition, and the additional condition to the dependent word. The formal variable identifier should preferably use no overlapped name in the same meaning structure changing rules. The formal variable identifier is used to indirectly indicate a node in the templates of the operation instructions language.

The application antecedent part 39 comprises a proper number (m) of conditions.

The consequent part 37 comprises a natural language consequent part 43 and an application consequent part 44. The natural language consequent part comprises a proper number (k) of operation instructions language templates. The application consequent part 44 also comprises a proper number (1 in the figure) of operation instructions language templates.

The following describes contents of the processes on the basis of actual data for the embodiment of the present invention in detail by reference to FIGS. 4 through 31.

The application in the embodiment of the present invention, or the decision support system, is a system for executing a data base retrieval function, a graph creation, modification, and delete functions, and an information offering function of items displayed on the screen.

Figures 17, 18:
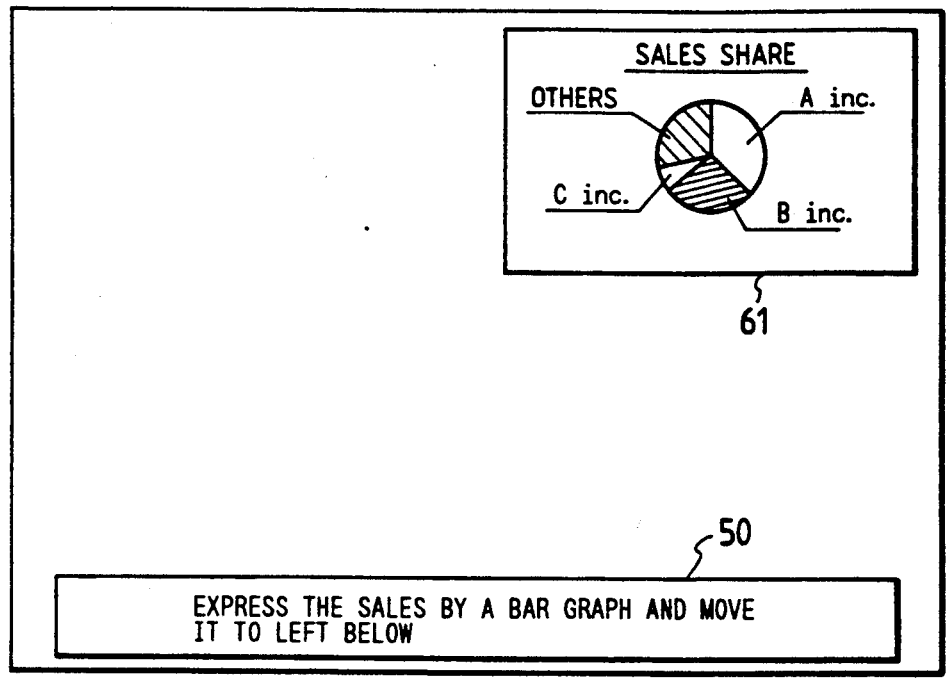
FIGS. 17, 21, 25, and 29 are examples of images on the output device in the embodiment. The images include the entered natural language as well as the results of execution of the operation instructions language (for example, figures).
FIGS. 18, 22, 26, and 30 are examples of contents in instantiation data corresponding to the images in FIG. 17, 21, 25, and 29.

As an example, the output device 27 displays as shown in FIG. 17. The figure shows a state that when the output device 27 has sales data 61 displayed in circle graph thereon, a natural language text "Express the sales by a bar graph and move it to left below." 50 is entered.

First, the instantiation data table 10 is initialized (step 2401 in FIG. 13) by the process of acquiring and storing the display information (step 24 in FIG. 4). In the beginning, for example, the process initializes on the basis of the display information as shown in FIG. 17, except the indication 50.

FIG. 18 shows an example in which parts of the instantiation data table 10 are initialized. The instantiation data table 10 comprises a meaning label 62 and an instantiation method 63. The instantiation method 63 comprises a Table 64 for storing the data to be looked for execution of the instantiation function Table, a Field 65 for storing the data to be looked for execution of the instantiation function Field, and a Place 66 for storing the data to be looked for execution of the instantiation function Place. Any of the instantiation functions originally has data reference procedures and data remaking procedures described therein. For ease of explanation, it is made a function to execute only a process of looking up a column for the instantiation function of the instantiation data table 10. A program having the data reference procedures and the data remaking procedures can be easily made if their contents are made clear. Description of it is ignored here.

For example, if data of concept "sales" is stored in a field called the "sales" of a data base called a "GOODS$_{13}$MASTER", the meaning label 62 is initialized to "sales", Table 64 to "GOODS$_{13}$MASTER", and Field 65 to "sales" as in the 5th record in the instantiation data table 10. The meaning labels 62 in records 2 to 4, that is, "right up", "center", and "left below" are initialized to "RIGHT$_{13}$UP", "center", and "LEFT$_{13}$BELOW" in Place 66, respectively. As the circle graph 61 is present on the display, it is selected (step 2402 in FIG. 13). The circle graph 61 is a graph named a "WORK$_{13}$TABLE$_{13}$1" in terms of contents of an area stored at a stage of display. As the decision support system, the information displayed on the output device and the information to display (positions and colors, etc.) are kept stored as necessary. It is recognized that it is indicated on the "right up". The "WORK$_{13}$TABLE$_{13}$1" is stored in Table 64 (step 2405) as shown in record 2. As one object is displayed, a concept "pronoun in the close case to the speakers" is made to correspond to the circle graph 61, and the "WORK$_{13}$TABLE$_{13}$1" is stored in Table 64 (step 2406) as in record 1. Note that the instantiation data table 10 is always updated in the processes from step 24 to 25, that is, it is updated according to the indication or input situation on the display.

The user should select the "execution mode" by the input device 26 (step 16), and enter the natural language text "Express the sales by a bar graph and move it to left below." 50 (step 1). FIG. 17 shows the screen on the output device 27 when the sales data are indicated in the circle graph, and when the natural language text "Express the sales by a bar graph and move it to left below." 50 is entered.

The entered natural language text is divided into morphemes by the morphological analysis with it looking the dictionary 8 (step 1110). Each of the morphemes is restricted in the scope of the meaning by the disambiguation (step 1111). They are constructed to chained functions structure with respect to the operation instruction node by the semantic analysis (step 1112). The term "operation instruction node" as used hereinafter denotes a node of chained functions structure the attribute of which is "function".

The following describe the semantic analysis (step 1112) in further detail. For the natural language text for which the disambiguation has been completed, the prototype of the chained functions structure is built up in the construction process for the prototype of the chained functions structure (step 1106).

Figure 16:
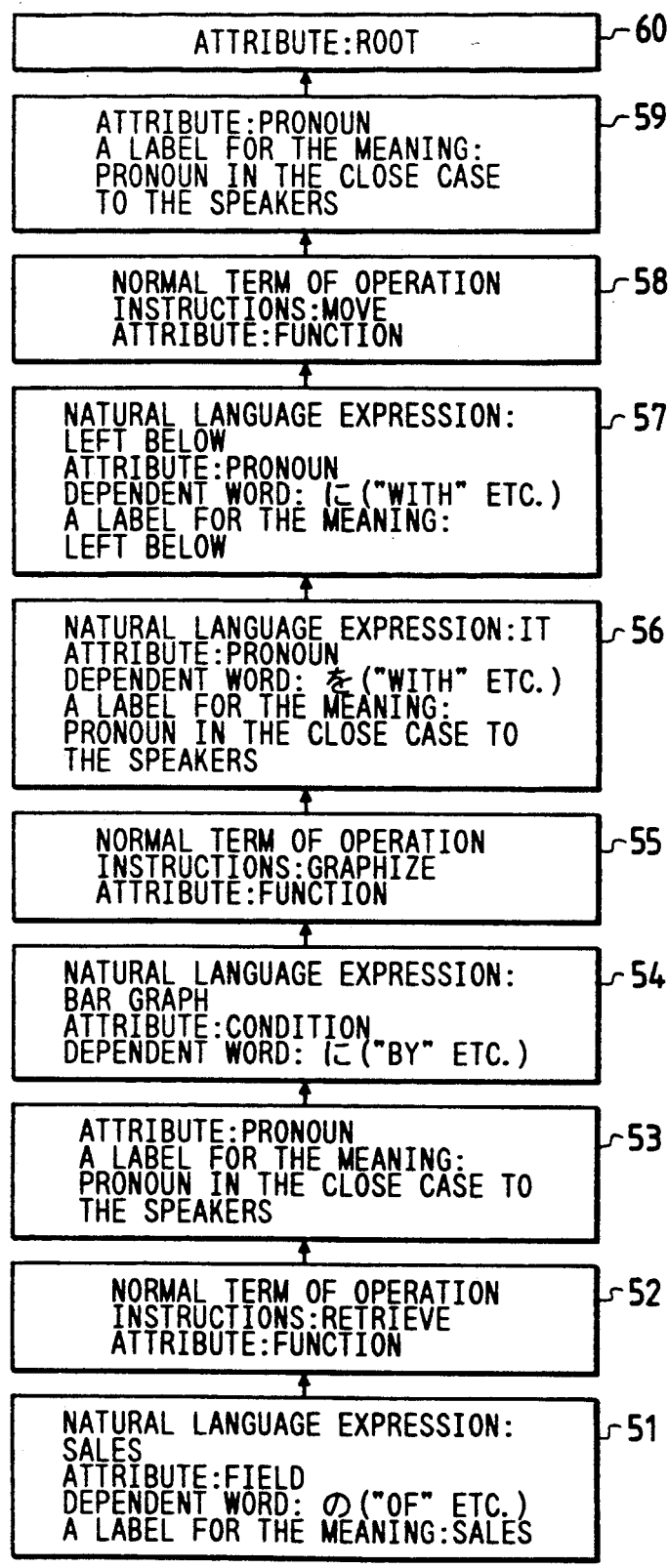
FIG. 16 is an example of prototypes of the chained functions structure as results of the constructional process of the chained functions structure (step 1107 in FIG. 6) for the example of the chained functions structure "Express the sales by a bar graph and move it to left below."

FIG. 16 shows the results obtained in the way that special expressions in the entered natural language text 50 are analyzed, and the modification process for the prototype of the chained functions structure is executed (step 1107). In the figure, blocks represent nodes. Node 51 corresponds to the "sales" in the natural language text. The link with direction put out of the node 51 is continued to node 52. The node 52 is a node for "retrieve" collected and recovered through the declinable word collection and recovery process (step 1107(F) in FIG. 9). Node 53 is a node for substitution of results of the operation instruction recovered at step 1107(F). Note 54 is a node corresponding to the "by a bar graph" in the example. Node 55 is a node for the "graphize" collected and recovered at the declinable word collection and recovery process (step 1107(F)). Node 56 is a node corresponding to the "it" in the example. Node 57 is a node corresponding to the "left below" in the example. Node 58 is a node corresponding to the "move" in the example. Node 59 is a node for substitution of results of the operation instruction recovered at step 1107(F). Node 60 is a root node for the prototype of the chained functions structure. Description of the link with direction between the nodes were ignored as it will be apparent in the figure.

Returning to the description of the semantic analysis, the prototype of the chained functions structure is a structure for which the above mentioned nodes 59, 55, 53, and 52 are not recovered in the chained functions structure shown in FIG. 16. Description of the process for recovering the nodes is repeated below. The declinable word "retrieve" is recovered as the node 52 to clear the data position of the "sales" at the node 51. The declinable word "graphize" is recovered as the node 55 to make the "(by) a graph" at the node 54 correspond to the language of operation instructions which depends on the application, which is a computer command to be executed or a command for an application program executed by the computer. (This corresponds to step 1107(F) in FIG. 9.). Recovery is made of the insufficient nodes (nodes 53 and 59) among the nodes in which the results of the operation instruction nodes (nodes 52, 55, and 58) are to be stored. (This corresponds to step 1107(F)). As a result, the process given in FIG. 16 is obtained.

Figures 19, 20:
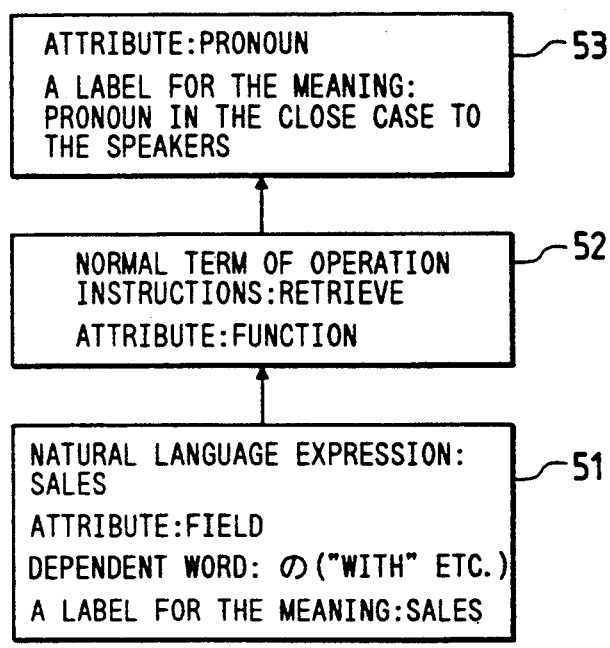
FIGS. 19, 23, and 27 are results of the chained functions structure extraction processes (step 19) in FIG. 4, and partial structures of the chained functions structure of an operation instruction node with a node as to its data, conditions, and returning values.
FIGS. 20, 24, 28 are results of the instantiation to the operation instructions languages (step 15 in FIG. 4) corresponding to the partial structures of the chained functions structure shown in FIGS. 19, 23, and 27, respectively, and examples of sentences of the operation instructions languages for actually operating a decision support system (DSS) which is an application described as the embodiment.

With the chained functions structure extraction process (step 19 in FIG. 4), the partial structures (which correspond to nodes 51, 52, and 53) in FIG. 19 are extracted from the chained functions structure in FIG. 16. As just looking up is made in step 19, the chained functions structure is not deformed actually in the way that the partial structure in FIG. 19 is isolated from the chained functions structure in FIG. 16.

The meaning structure changing rules selection process (step 13 in FIG. 4) is made by selecting the meaning structure changing rules table 9 from the meaning structure changing rules table 9 on the basis of the partial structure in FIG. 19. To search the meaning structure changing rules table 9 from the beginning, the parameter, which is a pointer indicating the rule ID number 35, is initialized (step 1301 in FIG. 10). First, selection is made of the meaning structure changing rules in which the rule ID number 35 of the meaning structure changing rules is "001" (step 1302). Then, the data in the matching point table is initialized to "0" (step 3401). As the normal term of operation instruction 40 of the operation instruction node 52 in FIG. 19 is "retrieve" while the normal term of operation instruction 40 of the said meaning structure changing rules is "move" (step 3402), the flag "unsuccess" is set (step 3423).

As a result, the condition at step 1303 is not met. Process is returned to step 1302 again to select the meaning structure changing rules in which the rule ID number 35 of the meaning structure changing rules is "002". The data in the matching point table is initialized to "0" (step 3401). This time, as the normal term of operation instruction 40 of the meaning structure changing rules in which the rule ID number 35 is "002" is "retrieve", it coincides with that of the operation instruction node 52 (step 3402). Process goes to step 3403. As the pair of the child node condition 42 of the meaning structure changing rules to be processed with the child node of the operation instruction node, there is a pair of the first node condition of the meaning structure changing rules in which the rule ID number 35 is "002" with the child node 51 of the operation instruction node (step 3403). Here, the matching point of the paired combination is initialized to $k_0$, for example, to "0". The child node condition of the said meaning structure changing rules has no natural language expression condition imposed thereon (step 3404), the matching point has the weight $k_1$, for example, "1" added thereto (step 3406). In turn, as the child node condition of the said meaning structure changing rules has the attribute condition imposed thereon (step 3409) and as the attribute condition of the child node condition of the said meaning structure changing rules and the attribute of the child node 51 of the operation instruction node are both "field" (step 3410), the matching point has the weight $k_4$, for example, "4" added thereto (step 3412). In turn, the dependent word expression condition of the child node condition of the said meaning structure changing rules and the dependent word expression of the child node 51 of the operation instruction node coincide by "with etc.)" (step 3415), and as the additional condition to the dependent word of the child node condition of the said meaning structure changing rules is "optional" (step 3416), the matching point has the weight $k_8$, for example, "8" added thereto (step 3418). With the process described above, the matching point is made "13", which is stored in the matching point table (step 3419).

There are no other pairs of the child node condition 42 of the meaning structure changing rules to be processed with the child node of the operation instruction node (step 3403). Pairs in the matching point table are determined in higher order of matching point (step 3420). The pair of the first child node condition of the meaning structure changing rules with the child node 51 of the operation instruction node took a point of "13" in the example, with no pairs having any point. That pair is determined. As the pair determined at step 3420 has the positive value "13" as the matching point (step 3421), the flag "success" is set (step 3422). Consequently, as the said meaning structure changing rules is "success" (step 1303), the rule ID number 35, that is, "002," of the said meaning structure changing rules is output as a returning value for looking in the following processes. (step 1304).

In turn, process is moved to the instantiation process to the operation instructions language (step 15). It is made to take out the template of the operation instructions language of the consequent part 37 of the said meaning structure changing rules the rule ID number 35 of which is "002" (step 1501). The template of the first operation instructions language is the operation instructions language template of the natural language consequent part 43, which is a "return (table)" in the example.

As the operation instructions language template contains no instantiation function (step 1502), that operation instructions language is output (step 1505). The operation instructions language "return" is an operation instruction language which rewrites the attribute ("pronoun" in the example) of the parent node 53 of the said operation instruction node 52 by an argument ("table" in the example) of the operation instruction node. The language 53 in the chained functions structure looked below, therefore, becomes like the node 53 in FIG. 23.

In turn, it is made to take out the template of the operation instructions language of the consequent part 37 of the said meaning structure changing rules the rule ID number 35 of which is "002" (step 1501). The template of the second operation instructions language is the operation instructions language template of the application consequent part 44, which is a "Select Field(objl) in Table(objl) into Newname" in the example. The objl as used therein denotes a formal variable identifier in the child node condition 42 in the said meaning structure changing rules.

In the process at step 1502, a first instantiation function in the template of the operation instructions language is "Field(objl)". Looking the instantiation data table 10 (FIG. 18), the "Field(objl)" is replaced by "sales" (step 1503).

In the process at step 1502, a second instantiation function in the template of the operation instructions language is "Table(objl)". Looking the instantiation data table 10 (FIG. 18), the "Table(objl)" is replaced by "goods master" (step 1503).

In the process at step 1502, a third instantiation function in the template of the operation instructions language is "Newname". A name which has not been used in the current system, for example, "worktable 2", is assigned for Newname (step 1503).

After the processes mentioned above, the templates of the operation instructions language has no instruction function to be processed. This operation instructions language, then, is output to the operation instruction language execution program 31 which executes the operation instructions language. (step 1505). The operation instructions language shown in FIG. 20 is output.

The operation instructions language shown in FIG. 20 is a character string of the operation instructions language which actually run the decision support system. An example of the decision support system is a decision support system having the EXCEED (Executive Management Decision Support System), Hitachi Seisakusho Co., Ltd. The EXCEED executes the operation instructions language like the one in FIG. 20 as a command given to the system.

As the consequent part 37 of the said meaning structure changing rules has no meaning structure changing rules to be processed (step 1501), the instantiation process to the operation instructions language (step 15) ends.

Figures 21, 22:
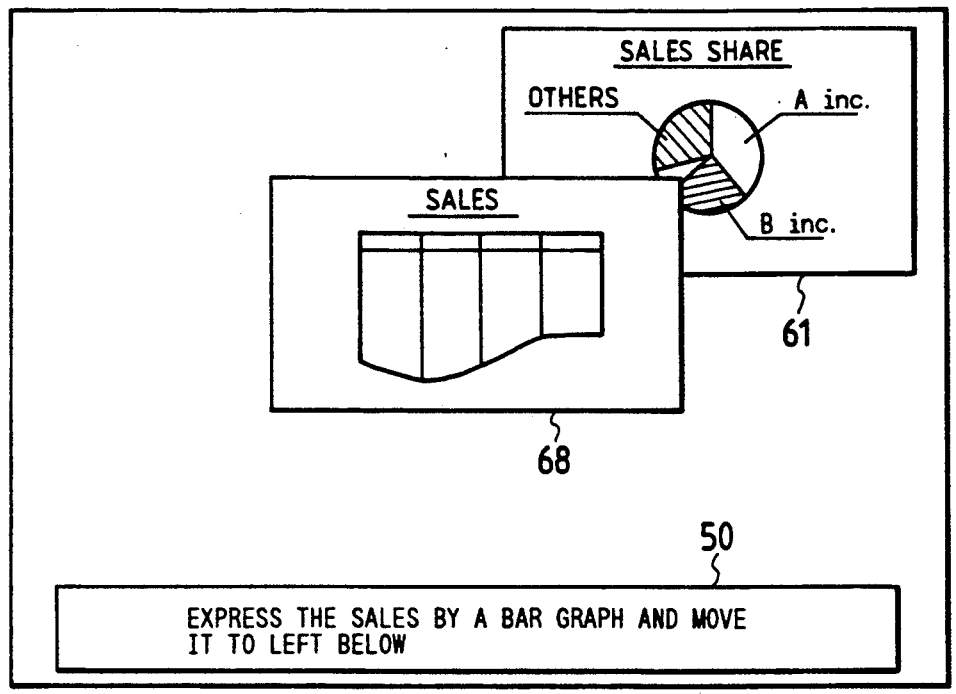

Step 5 executes the operation instructions language created as described above. The output device 27, therefore, becomes as shown in FIG. 21 by the operation instruction language execution program 31. After this, the instantiation data table 10 is updated by the process for acquiring and storing the display information (step 24) as shown in FIG. 22.

The chained functions structure in view of the operation instruction node is rebuilt on the basis of the chained functions structure updated by the previous operation instructions language "return (table)" (step 11).

Figures 23, 24:
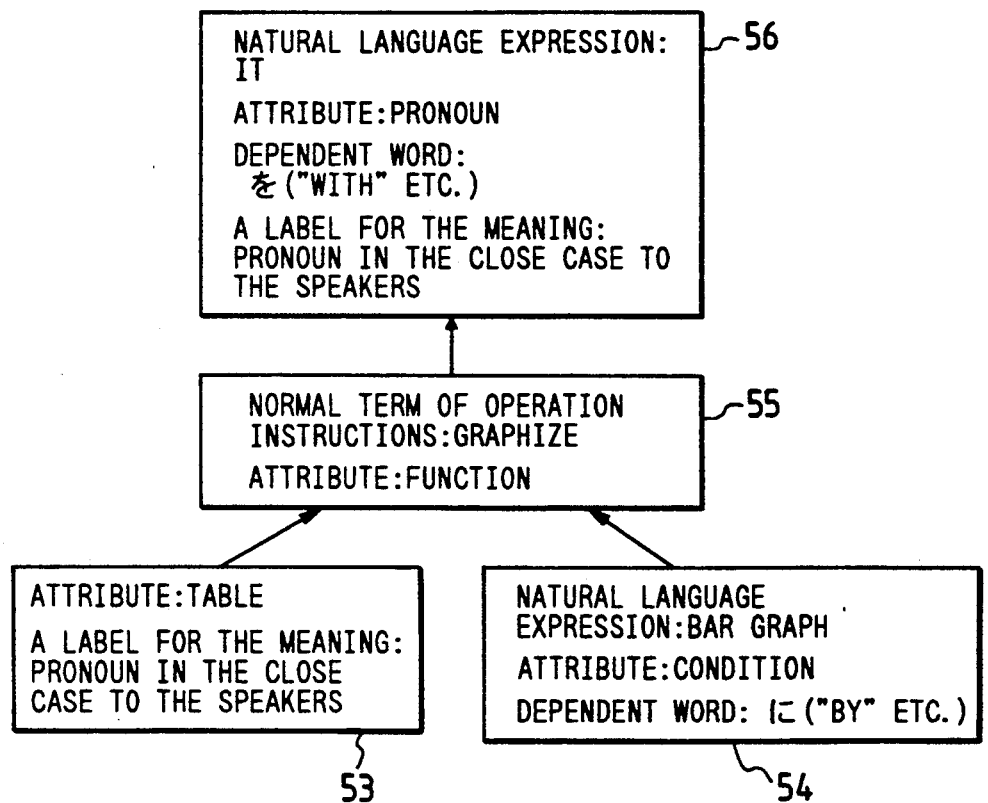
Figures 25, 26:
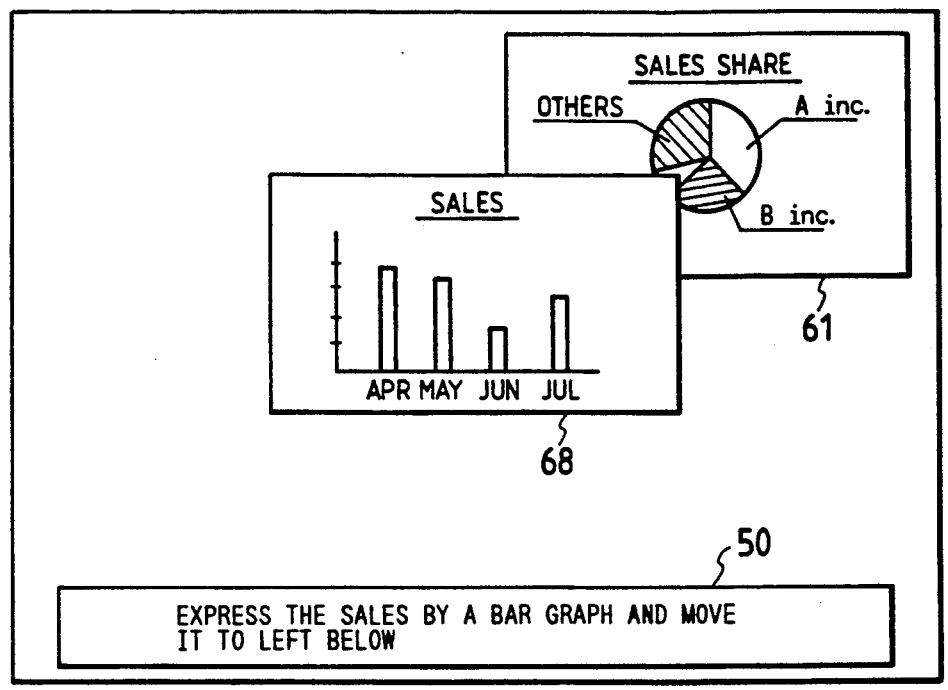

In turn, as the chained functions structure has still partial structure to be instantiated (step 18), the partial structure in FIG. 23 is extracted from the chained functions structure by the chained functions structure extraction process (step 19).

In a process similar to the one described above, the meaning structure changing rules the rule ID number 35 of which is "003" is selected from the meaning structure changing rules table 9 (FIGS. 14 and 15) (step 13).

In turn, a "return (table)" and the operation instructions language shown in FIG. 24 are obtained using the instantiation data table 10 (FIG. 22) (step 15).

In turn, the operation instructions language is executed (step 5) to update the information in the chained functions structure in similar process described above. The output device 27 is made like in FIG. 25 by the operation instruction language execution program 31, that is, the decision support program. The instantiation data table 10, then, is updated as in FIG. 26 by the process for acquiring and storing the display information (step 24).

The chained functions structure in view of the operation instruction node is rebuilt on the basis of the chained functions structure updated by the previous operation instructions language "return (table)" (step 11).

Figures 27, 28:
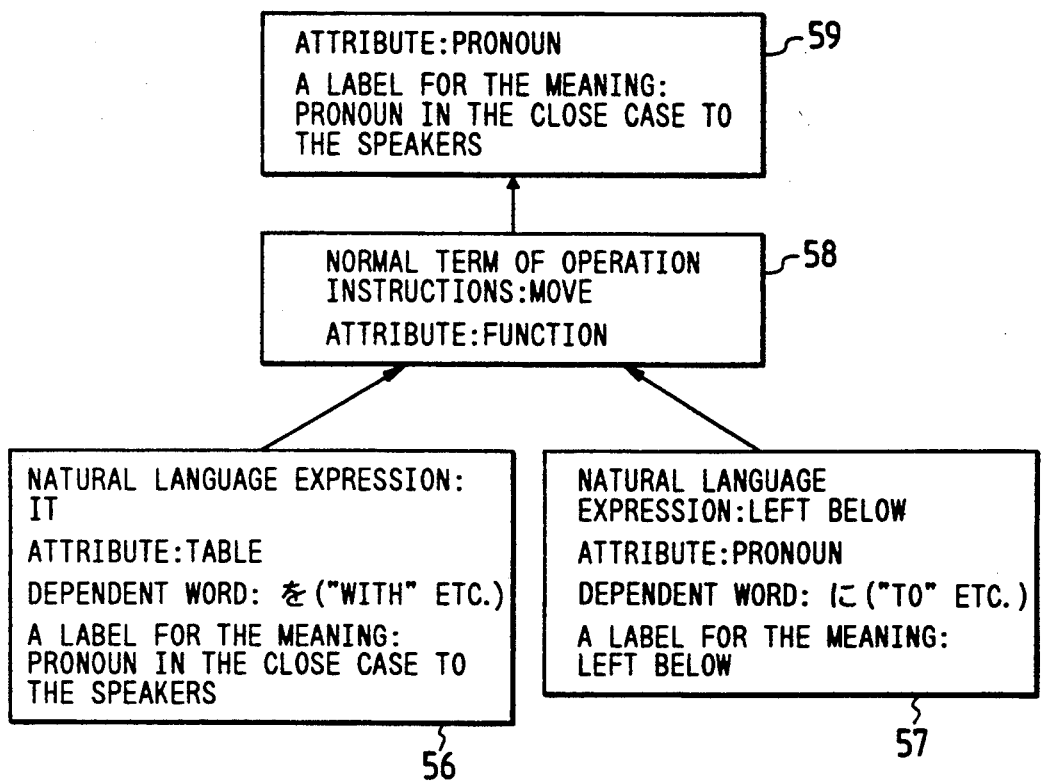
Figures 29, 30:
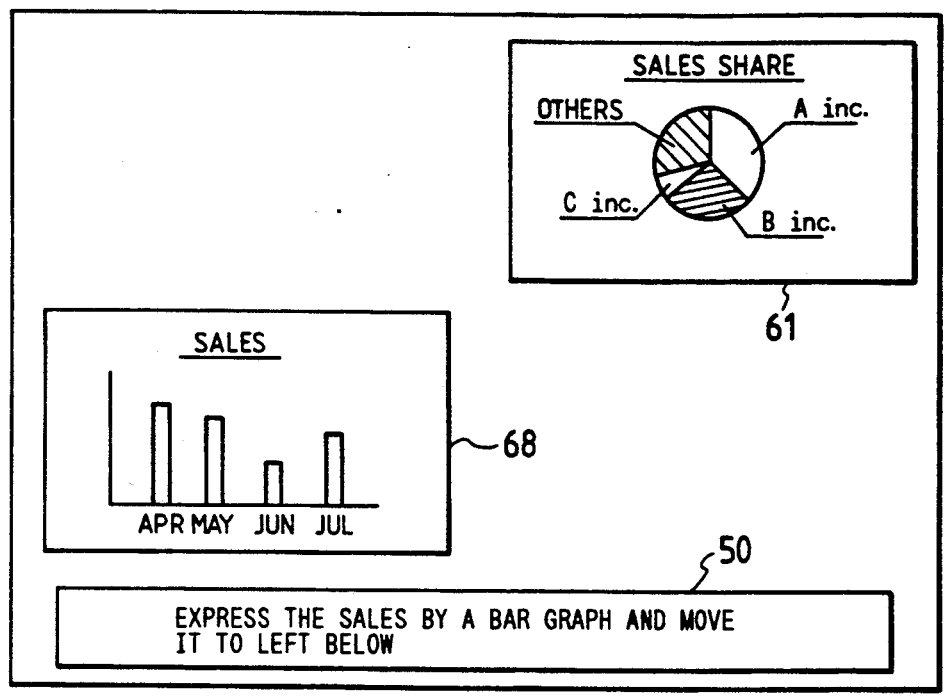

In turn, as the chained functions structure has still partial structure to be instantiated (step 18), the partial structure in FIG. 27 is extracted from the chained functions structure by the chained functions structure extraction process (step 19). In a process similar to the one described above, the meaning structure changing rules the rule ID number 35 of which is "001" is selected from the meaning structure changing rules table 9 (FIGS. 14 and 15) (step 13). A "return (table)" and the operation instructions language shown in FIG. 28 are obtained using the instantiation data table 10 (FIG. 26) (step 15). In turn, the operation instructions language is executed (step 5) to update the information in the chained functions structure in similar process described above. The output device 27 is made like in FIG. 29 by the operation instruction language execution program 31, that is, the decision support program. The instantiation data table 10, then, is updated as in FIG. 30 by the process for acquiring and storing the display information (step 24).

As the chained functions structure has no partial structure to be instantiated therein (step 18), the process is made to end.

Figure 31:
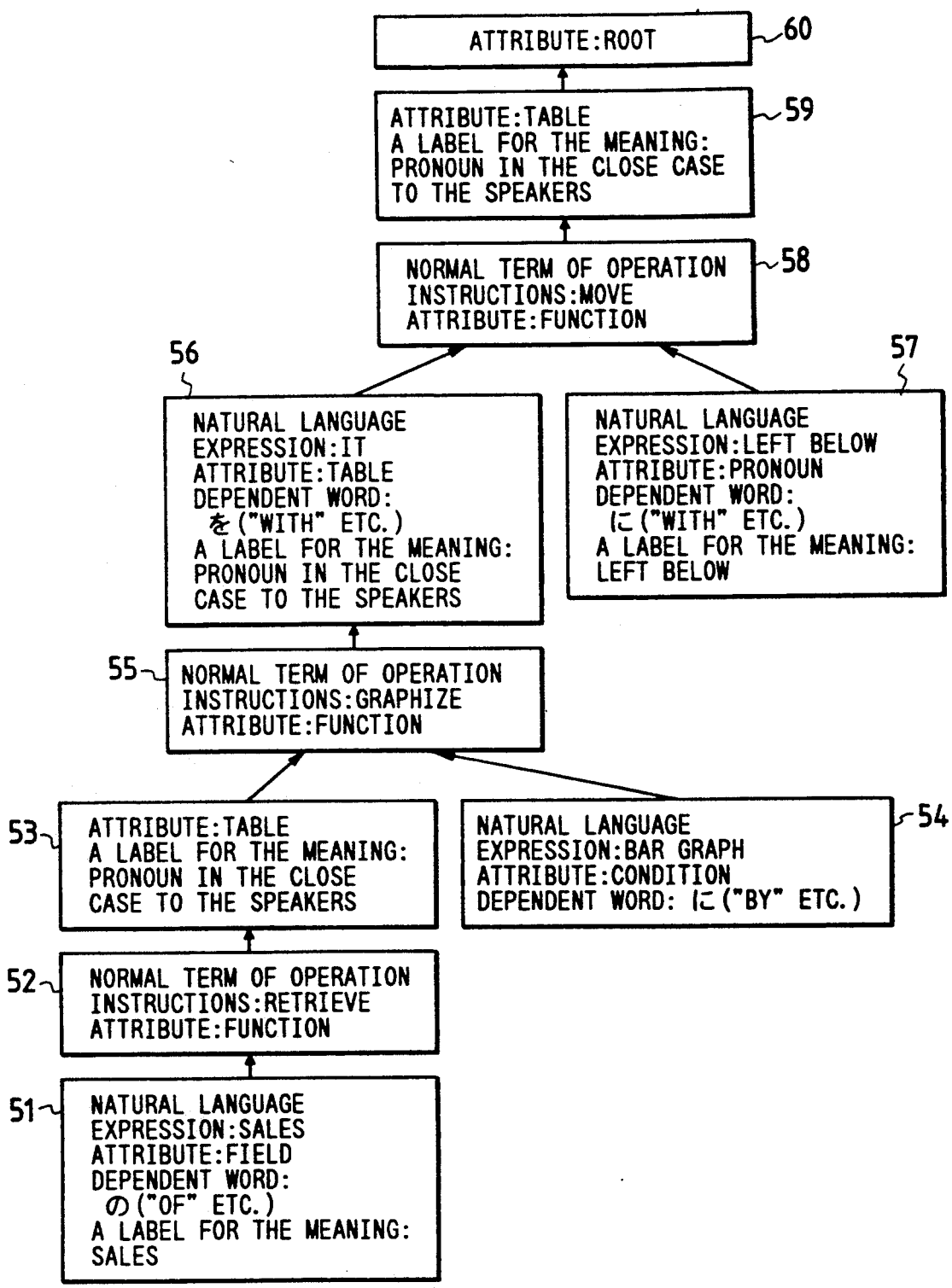
FIG. 31 is an example of the chained functions structure finally constructed from the entered natural language text.

FIG. 31 shows the chained functions structure at the final end for the natural language text entered in the embodiment of the present invention.

In the description so far given, for ease of understanding, the processes have been given in sequence, and made not only to have the final results (FIG. 29) corresponding to the entered natural language text, but also to have results on the way (FIGS. 21 and 25) output. The results on the way may be output for ease of control. But, they should not be output in the actual operation. The reason is that the output display of the results on the way will be immediately rewritten by the display showing the final results. Even if the system is made so that the output display of the results on the way can be rewritten at a speed which the user can recognize, he/she will not be able to see contents of the display. He/she, on the contrary, will be disturbed by them as flicker of the display. If he/she wants to have a display corresponding to the results on the way, then he/she will enter the natural language text so that necessary display can be output.

However, there is such a request that the entered natural language text is to be output in a plurality of displays in sequence, for example, that "Show sales in a list, and represent its contents by a bar graph" is entered. Then, the process can be made in the way that the sales is indicated by the list, the user is requested to answer, he/she responds to it, and the bar graph is indicated. Alternatively, the system is made to have a right of indication and arrangement of the list and bar graph to indicate the list and bar graph together. To process such a plurality of sentences, these may be entered at once (step 1). Otherwise, if step 18 judges "NO," process should be returned to step 1 to allow the next sentence to be entered. This can interpret the sentences correctly. The alternative operations mentioned above will be easily understood without further explanation of them.

With the above process, the anaphora of the pronoun "it" is interpreted on the basis of the execution result of the operation instructions language generated on the basis of the previous text. With the process, therefore, the plurality of sentences and a long sentence can be interpreted correctly even if they are entered together at once.

Thus, the natural language text entered by the user can be instantiated to operation instructions language accordingly even if it is incomplete sentence to a certain degree. The incomplete sentences include sentences containing anaphoras by pronouns or similar words, sentences requiring recovery of elliptic words, and sentences requiring disambiguation of meaning depending on situation. The user, therefore, can adequately operate specific applications through the natural language without knowledge of complicated operation instructions language system, operating instructions system, and data structure system which are different for each application.

The system in the embodiment of the present invention always continues to update the instantiation data table 10. It therefore can interpret the natural language text having nondeterministic properties contents of which cannot be uniquely interpreted only by the entered natural language text and which depends on the situations, such as the display indication status and operation history.

Now, the following describes a case that the user selects the "maintenance node" on the input device 26. The system selects a table or file to be maintained from among the dictionary 8, the meaning structure changing rules table 9, and instantiation data table 10 as directed by the user (step 20), and branches to the process corresponding to the selection, such as maintaining the dictionary 8 (step 21), maintaining the meaning structure changing rules table 9 (step 22), or maintaining the instantiation data table 10 (step 23). Any of the maintenances processes includes function to edit data of each items in the corresponding table, such as reference, creation, addition, update, deletion, and saving, as selected by the user. Description of the function to edit are ignored here as they can be accomplished in the known art.

In the embodiment of the present invention described so far, the present invention is applied to the decision support system. It can be easily seen that the present invention can be used to other systems, such as an expert system, a schedule management system, an information retrieval system, and an operating system if the data, particularly the template of the operation instructions language, of the meaning structure changing rules table 9 is changed. In other words, the present invention can be easily applied to systems in which interface between a computer and human being is accomplished with use of the natural language if contents of the meaning structure changing rules table 9 and instantiation data table 10 are changed, or if they are edited with use of the maintenance mode, accordingly.

Figure 32:
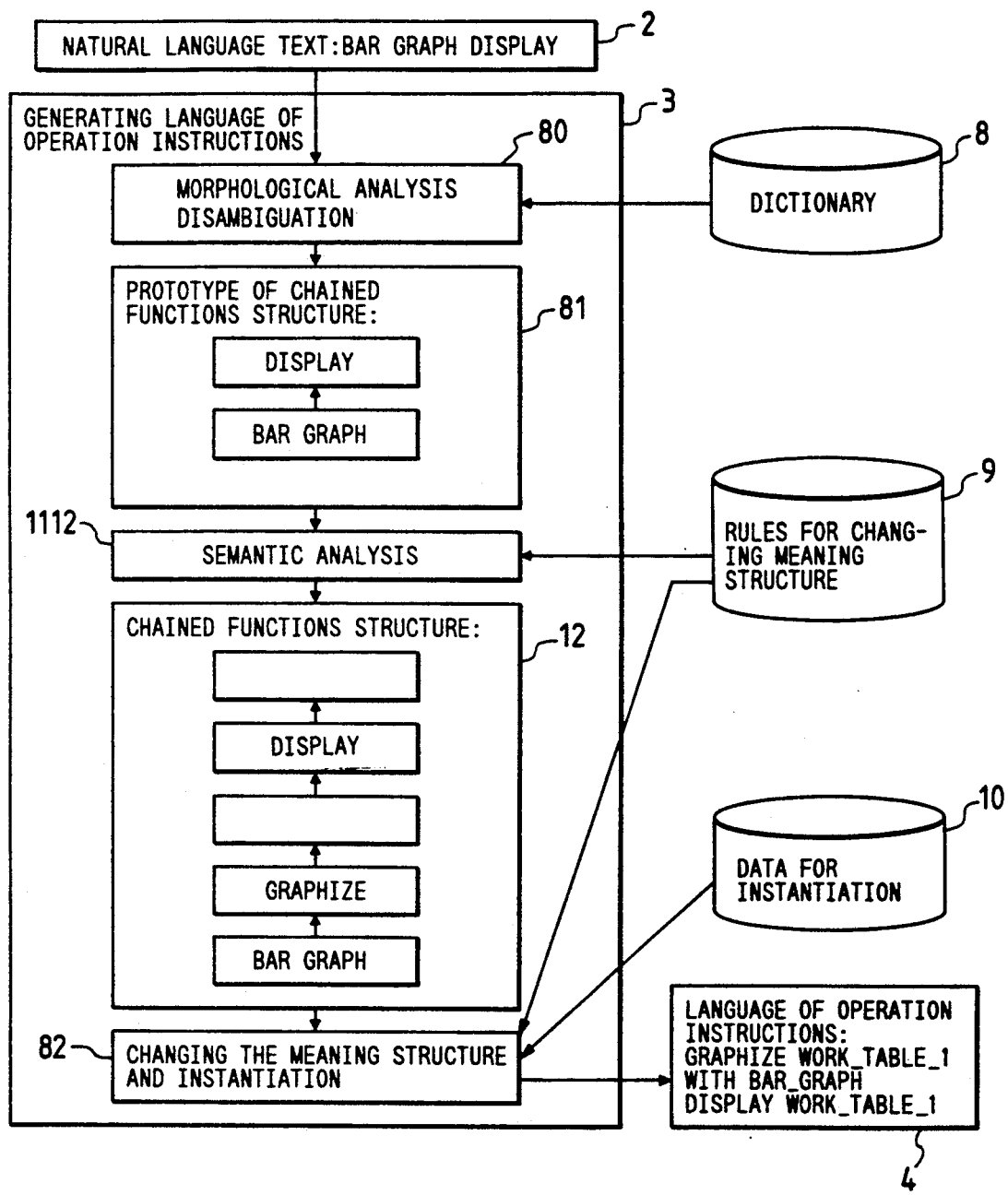
FIG. 32 is an outline illustrating a modification of the embodiment of the present invention, and an outline illustrating a method for chiefly interpreting an elliptic expression in the natural language text.

The following descriptions is a modification of the embodiment of the present invention described before in which the natural language text is contains extreme elliptic expression in conversation, by reference to FIG. 32.

References in FIG. 32 identical with those in FIGS. 1 to 32 are indicated by the same numbers.

It should be noted that description of some of the same processes as in the preceding embodiment are ignored here for chief description of method of interpretation of the elliptic expression in the natural language text.

Let "bar graph display" be entered as the natural language text (numbered 2 in FIG. 32).

In response to the input, the operation instructions language is generated (step 3). Step 3 makes morphological analysis and disambiguation with use of the dictionary first (step 80). Step 80 constructs a prototype (81 in FIG. 32) of the chained functions structure from the natural language text. Step 80 is similar to steps 1110 and 1111 mentioned previously. In turn, the meaning structure changing rules table 9 is used to make semantic analysis (step 1112). Step 1112 constructs a chained functions structure (12 in FIG. 32) from the prototype of the chained functions structure. The concept of the chained functions structure was described previously. In turn, the meaning structure changing rules table 9 and instantiation data table 10 are used to make meaning structure changing and instantiation (step 82). Step 82 is similar to steps 18, 19, 13, and 15. Step 82 generates a operation instructions language (4 in FIG. 32) from the chained functions structure. Description of the processes will be enough for the modification.

The natural language text 「棒グラフ表示。」 (which means "bar graph display") in the modification is a natural language text containing omissions. It, for example, is regarded an elliptic expression of 「これを棒グラフでグラフ化して、それを表示しろ。」 (which means "Graphize this in bar graph, and make it display"). The following describes types of such an elliptic expression and actual methods for collecting and recovering the omissions.

A first type of elliptic expression is a type corresponding to the above sentence having the 「これを」 (which means "this") omitted. That is, it omits a case element. In the above sentence, an object case is omitted.

To interpret the elliptic expression, the meaning structure changing rules table 9 is made to have a plurality of meaning structure changing rules prepared for use in interpretation of one elliptic expression. From among those, adequate meaning structure changing rules are selected in order of priority. The priority order should be defined in advance so as to correspond to the meaning structure changing rules in the meaning structure changing rules table 9. Highly general meaning structure changing rules, for example, should have low priority, and highly special meaning structure changing rules should have high priority. The definition of the highly special meaning structure changing rules can have the case element supplied in advance to recover the first type of elliptic expression.

A second type of elliptic expression is a type corresponding to the above sentence having a term (which means "in") omitted. That is, it ignores a dependent word. In the above sentence, a postpositional particle indicating means is ignored.

With omission of the dependent word, it is hard to select a meaning structure changing rules as the matching point of the desired meaning structure changing rules is made lower. However, selection is made of the same meaning structure changing rules as in no omission of the postpositional particle as long as another optimum meaning structure changing rules is provided. As a result, the same interpretation is made.

A third type of elliptic expression is a type corresponding to the above sentence having the 「グラフ化して」 (which means "graphize") omitted. That is, it ignores an independent word. In the above sentence, the declinable word is ignored.

To interpret the elliptic expression, the dictionary should have words tended to be omitted and usages and citations corresponding to the words in advance. This allows the words "bar graph" to prompt recovery of the declinable word "graphize" from the corresponding meaning structure changing rules in the collection and recovery process of omissions of the declinable words and indeclinable parts of speech (1107(E)).

A fourth type of elliptic expression is a type corresponding to the above sentence having the 「それを」 (which means "it") omitted. That is, it ignores an anaphora indicating the preceding process result. In the above sentence, the pronoun indicating the result of the preceding process is ignored.

The elliptic expression can be automatically recovered in a way that the chained functions structure treats the result of the preceding process as an input condition or data for the succeeding process.

A fifth type of elliptic expression is a type corresponding to the above sentence having a term (which means "make") omitted. That is, it ignores inflected part of a word. In the above sentence, the inflected parts of the imperative mood of the suru-verb (which means "display") (for a Japanese word) is ignored.

For this elliptic expression, as the dictionary has a registration that the suru-verb 「しろ」 "display" is strong in the functional attribute, it can be interpreted as the declinable word even if the inflected part of the word is omitted.

Figure 33:
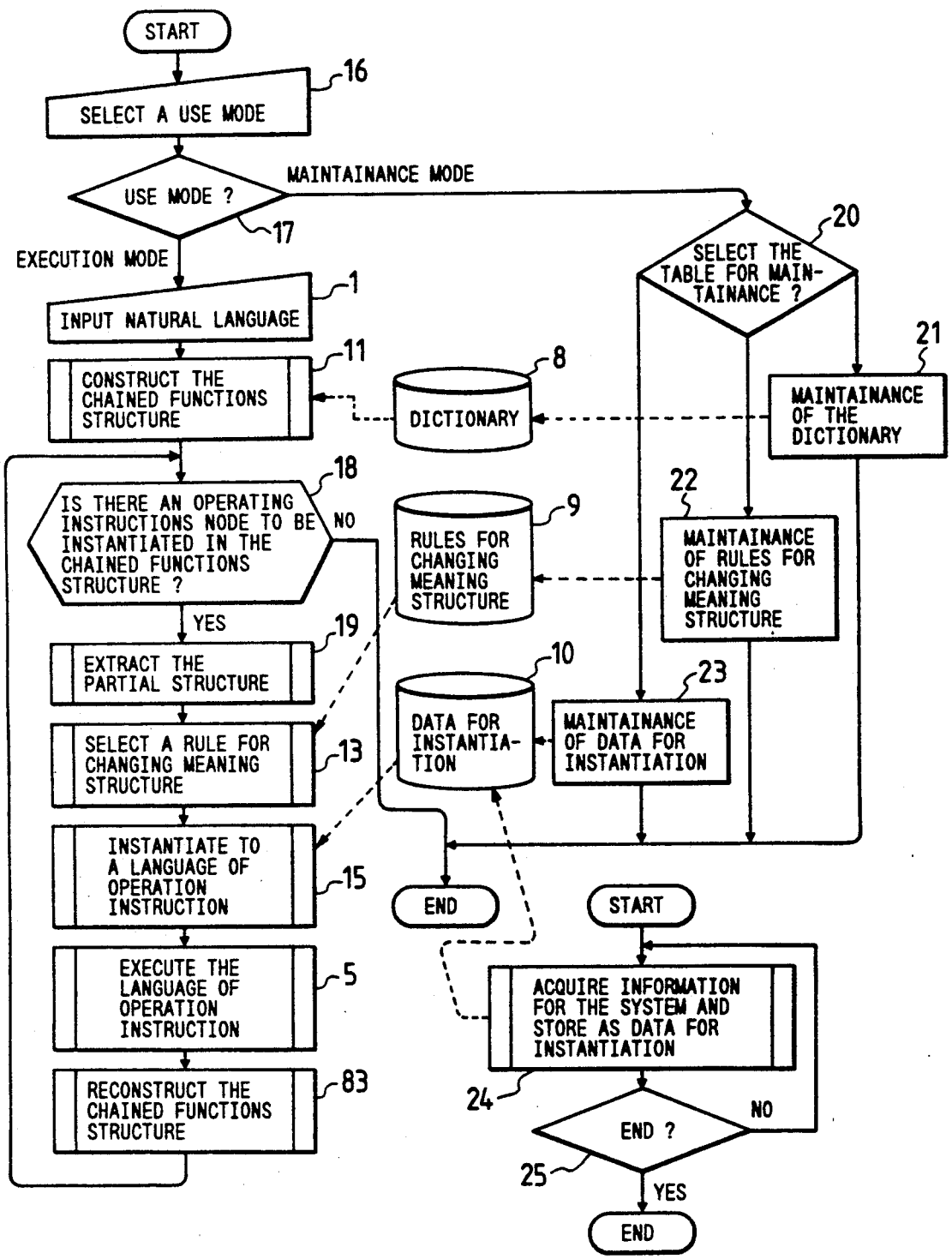
FIG. 33 is a flow chart illustrating another modification of the embodiment of the present invention, and illustrating process procedures having processes for reconstructing only necessary portions of the chained functions structure.

The following describes a still another modification of the embodiment according to the present invention by reference to FIG. 33. References in FIG. 33 identical with those in FIG. 4 are indicated by the same numbers. Particulars in FIG. 33 are described below.

In the process shown in FIG. 4, step 11 for constructing the chained functions structure is overlapped when it is started first beginning with step 1 and when it is reconstructed as continued from step 5. To avoid this, the method given in FIG. 33 is featured in that the chained functions structure which has been already constructed is used again, and only portions needed are reconstructed (step 83).

Step 83 reconstructs the chained functions structure in a way that data of the node of the chained functions structure is updated on the basis of the operation instructions language giving data to the chained functions structure itself obtained at step 15. That is, in the chained functions structure being processed currently, post-order and depth-first search is made to search the operation instruction node for which processes have not been executed yet at step 19, 13, 15, 5, and 83. The child node of the searched operation instruction node has to meet the following two conditions. A first condition is that the child node is a node that has been passed until the searched operation instruction node is found. A second condition is that the child node is not an operation instruction node which has been processed at step 19, 13, 15, 5, or 83 and that it is not a node below the child node of the operation instruction node. The chained functions structure is reconstructed so that the node meeting the above conditions can become the child node of the operation instruction node for which the processes at step 19, 13, 15, 5, and 83 are not executed yet.

It should be noted that step 5 and 83 can be reversed in the process order as they are not dependent on each other.

Figure 34:
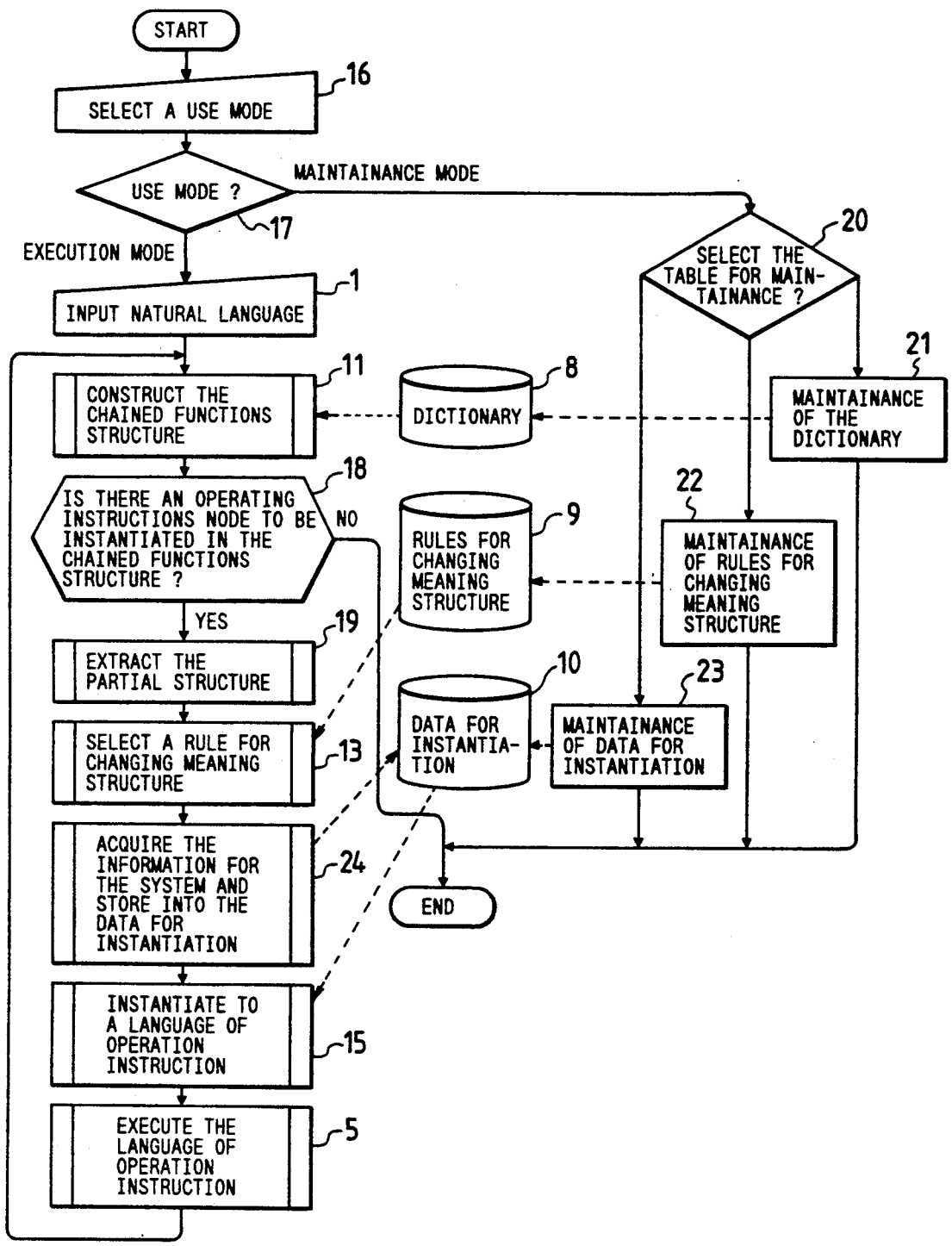
FIG. 34 is a flow chart illustrating another modification of the embodiment of the present invention, and illustrating process procedures for preventing the same information from being overlapped as acquired.

The following describes a still another modification of the embodiment according to the present invention by reference to FIG. 34. FIG. 34 is a flow chart where step 24 is inserted in front of step 15 in FIG. 4. References n FIG. 34 identical with those in FIG. 4 are indicated by the same numbers. Particulars in FIG. 34 are described below.

If the system status can be managed (step 24 in FIG. 4) sufficiently by executing for one operation instructions language, the modification shows that a process of acquiring and storing the system information, particularly the display information, should be executed at least once until the instantiation process to the operation instructions language (step 15) is executed in a loop of steps 11, 18, 19, 13, 15, and 5 (step 24).

This process can prevent acquiring the same information from being overlapped, while step 24 in FIG. 4 may likely cause overlapped process of the same information as its execution is not synchronized with the process of the operation instructions language. This means that the whole execution efficiency can be increased. The modification also is advantageous in that the storage efficiency of use can be increased, or the storage capacity can be reduced, as the history management of the overlapped information acquired in the process in FIG. 4 is not needed. It further is advantageous in that the present invention can be easily implemented as no programming techniques, such as multitasking, is needed. The modification is particularly effective in making the results corresponding to execution of one operation instructions language display as one still image.

Figure 35:
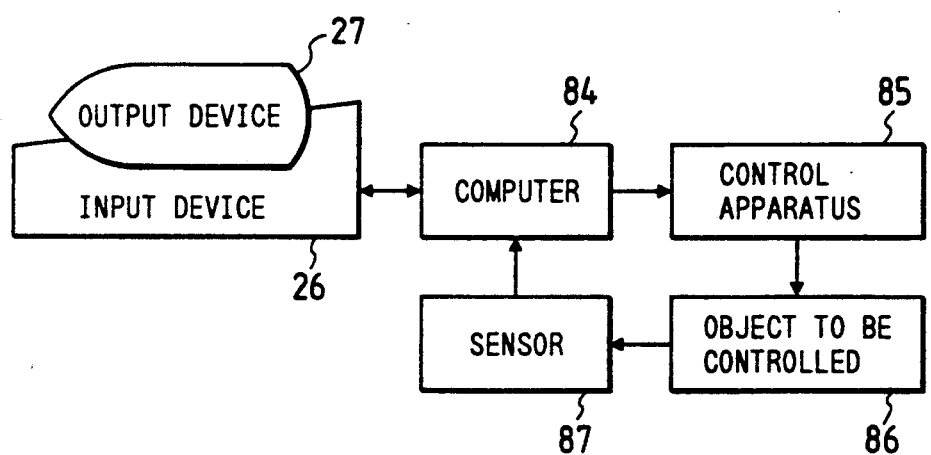
FIG. 35 is a configuration of another embodiment of the present invention which is applied to a control system.

The following describes another embodiment according to the present invention applied to a control system by reference to FIG. 35. References in FIG. 35 identical with those in FIG. 5 are indicated by the same numbers.

The embodiment has a microphone equipped with speech recognition device as the input device 26 and a measuring instrument and a speech output device as the output device 27 in addition to the apparatuses and devices shown in FIG. 5. The entered natural language text is converted to operation instructions language (control command) for a control device 85 by a computer 84 for executing the natural language processes according to the present invention which have been described fully. An object 86 is controlled by the control device 85. The object 86 to be controlled is measured by a sensor 87. The measured status information is output through a computer 84 to the output device 27 and/or is stored in the instantiation data table 10 to interpret the natural language text to be entered.

The control device 85, and the object 86 to be controlled, and the sensor 87 may be the same as the conventional ones. An operator in charge of control can control the object with the natural language by making the computer 84 executing the natural language processes according to the present invention.

In the embodiment of the present invention, the entered natural language text can be interpreted on the basis of the situation of discourse and its history input from the input device 26. The operation instructions language for the control device 85 can be generated, therefore, even for such natural language texts as "more left", "Look out!", "wow", and similar shrieks that are entered even if the operator does not intend to input.

The advantages of the present invention obtained in the embodiments and modifications described so far are as follows.

The operation instructions language and its contents can be determined more properly from sentences containing the anaphora by a pronoun or similar words. (The anaphora includes indirect expressions with use of "this", "that one", "right", "red", and similar words if concrete objects are expressed.) They also can be determined from sentences for which disambiguation of the meaning depending on the situation is needed. (These sentences include sentences the intention of which changes depending on the situation though they are expressed in the same character string.) These capabilities are obtained by the lazy evaluation of the natural language analysis to dissolve the nondeterministic contents of speech of the language depending on situation.

With the same reasons mentioned above, the present invention can properly interpret a plurality of sentences or a long sentences even if they are entered together at once.

Further, the user can operate applications, including database application, general computer applications such as executions of jobs, and computer controls of plants, airplanes, etc., without knowledge of the complicated operation instructions language system, operations system (order of operations, alternative operations, etc.), and data structure system in detail which are different for each application.

Further more, the system according to the present invention can be used as an interface available for a variety of applications. It therefore can reduce number of steps necessary for incorporation of the natural language interface into any of the applications with common use of the natural language process.

The most distinguished advantage of the present invention consists in particular in the fact that the system can make the computer operate in a desired mode with input of usual Japanese or English natural language, which generally is a sentence but may be words, without use of any of the formal languages usually given to the computer (special languages and command defined for the computer) and the operation instructions language called in the embodiments of the present invention.

What is claimed is:

1. A natural language processing method in a processor system having a database, an input device and an output device, comprising:
   a step of entering character strings of a natural language from the input device;
   a step of analyzing meanings of the entered character strings with use of a meaning label for defining an operation object, said meaning label being included i said entered character strings;
   a step of updating operating status data for instantiation to a command language, based upon an operating status of at least one of position and content of current data of said processor system, related to said meaning label; and
   a step of instantiating the command language, based upon results of performing the analyzing step and the operating status data updated in said updating step.

2. The natural language processing method according to claim 1, wherein the analyzing step comprises:
   a step of generating a chained functions structure expressing relationships among concepts of elements of the natural language of the entered character strings;
   A step of looking up a rule table which stores, in advance, rules of association relationship between a chained functions structure and a form of a command language which the processor system can execute; and
   a step of converting on the basis of results of performing the looking up step the generated chained functions structure to a form which the process can be executed.

3. The natural language processing method according to claim 2, wherein the step of instantiating a command language comprises:
   a step of extracting partial structures from the chained functions structure according to a command language; and
   a step of instantiating the command language for each of the extracted partial structures.

4. The natural language processing method according to claim 2, further comprising:
   a step of reconstructing the chained functions structure; and,
   a step of obtaining the command language according to the reconstructed chained functions structure.

5. The natural language processing method according to claim 2, further comprising storing the operating status data of the processor system in a storage of the processor system in advance.

6. The natural language processing method according to claim 5, further comprising storing the operating status data of the processor system in the storage according to results of execution of the command language.

7. The natural language processing method according to claim 5, further comprising storing the operating status data of the processor system independent of the step of instantiating the command language executed.

8. The natural language processing method according to claim 5, further comprising storing the operating status data of the processor system in the storage as a correspondent relationship between a position of the information as to the operating status data of the processor system and the concepts of the elements of the natural language.

9. The natural language processing method according to claim 8, further comprising using the concepts of the elements of the natural language containing at least one of pronouns, demonstrative, and words for indication of any extensions of the concepts of the natural language.

10. The natural language processing method according to claim 8, further comprising providing the position of the operating status data of the processor system indicating a display position of the information, a storing position in the storage, and a storing position in said data base.

11. The natural language processing method according to claim 2, further comprising providing the chained functions structure as a semantic network connecting among nodes of the concepts the elements of the natural language connecting through labeled links with direction, indicating the relationship among the concepts.

12. The natural language processing method according to claim 2, wherein the generating step further comprises:
 a step for executing a morphological analysis for dividing any of the character strings into morphemes;
 a step of executing disambiguation for limiting a range of the meaning of any of the morphemes divided above;
 a step of executing a semantic analysis with use of syntactic information and semantic information of any of the morphemes divided above which are stored in the storage given in the processor system in advance as a dictionary; and,
 a step of generating the chained functions structure from results of the semantic analysis.

13. The natural language processing method according to claim 12, further comprising limiting with the disambiguation an applicable range of the meaning of the morpheme with use of at least one of a position of the morpheme in any of the character string entered above and the syntactic information stored in the dictionary as to the morphemes divided above.

14. The natural language processing method according to claim 12, further comprising selectively executing by the semantic analysis analysis of quotation, deleting undefined words, and analysis of combined expression of numerical values and units for the chained functions structure with use of the syntactic information and the semantic information of the morphemes divided above.

15. The natural language processing method according to claim 12, further comprising selectively executing by the semantic analysis analysis of punctuation, analysis of combined expression of numerical values and comparative expression, analysis of partial negation, analysis of expression of starting and ending points, recovery of elliptic expression of declinable words, recovery of elliptic expression of indeclinable parts of speech, and analysis of logical relation expression.

16. The natural language processing method according to claim 1, further comprising providing the operating status data of the processor system including at least data as to an input history of any of the character strings of natural language entered above, data as to a history of the results of the analysis, and data as to the results of the execution.

17. The natural language processing method according to claim 16, further comprising providing the data as to the results of the execution containing data already output to the output device and data for managing output situation to the output device.

18. The natural language processing method according to claim 17, further comprising providing the data for managing the output situation to the output device containing data as to meanings, display positions, and display form of items indicated on a display.

19. The natural language processing method according to claim 1, further comprising updating said operating status data based upon results of previously executing a command language.

20. A natural language processing method adaptable for use in a processor system having an input device, the method comprising steps of:
 entering a character string comprising a material language via the input device;
 analyzing the character string using a meaning label defining an operation object, said meaning label being included in the character string and associated with initial operating status data;
 updating the initial operating status data to obtain intermediate operating status data based on one of position and content of initial data of the processor system;
 updating the intermediate operating status data based on one of the position and the content of intermediate data of the processor system; and,
 instantiating the command language based on the updating and the analyzing.

21. A natural language processing system adaptable for use with a computer comprising:
 a storage for storing a dictionary associated with a natural language and operating status data of the computer;
 an input device for entering character strings of the natural language;
 an output device;
 means for analyzing meanings of the entered character strings with use of;
 a meaning label for defining an operation object, said meaning label being included in said entered character strings;
 means for updating operating status data for instantiation to a command language, based upon an operating status of at least one of position and content of current data of said processor system, related to said meaning label; and
 means for instantiating the command language, based upon results of performing the analyzing step and the operating status data updated in said updating step.

22. The natural language processing system according to claim 21, wherein the means for analyzing comprises:
 means for generating a chained functions structure expressing relationship among concepts of elements of the natural language of the entered character strings;
 means for looking up a rule table which stores in advance, rules of association relationship between a chained functions structure and a form of a command language which the processor system can execute; and means for converting on the basis of results of operating the looking up means, the generated chained functions structure to a form which the process can be executed.

23. The natural language processing system according to claim 22, wherein the means for instantiating the command language comprises:

means for extracting partial structures from the chained functions structure according to a command language; and, means for instantiating the command language for each of the extracted partial structures.

24. The natural language processing system according to claim 21, wherein the operating status data of the processor system is stored in the storage as a correspondent relationship between a position of the information associated with the operating status data of the processor system and the concepts of the elements of the natural language.

25. The natural language processing system according to claim 24, wherein the concepts of the elements of the natural language contain at least one of pronouns, demonstrative, and words used for indication of any of extensions of the concepts of the natural language.

26. The natural language processing system according to claim 24, wherein the position of the operating status data of the processor system indicates a display position of the information, a storing position int he storage, and a storing position in a data base connected with the processor system.

27. The natural language processing system according to claim 21, wherein the operating status data of the processor system includes at least data as to an input history of any of the character strings of natural language entered above, data as to a history of the results of the analysis, and data as to the results of the execution.

28. The natural language processing system according to claim 27, wherein the data as to the results of the execution contains data already output to the output device and data for managing output situation to the output device.

29. The natural language processing system according to claim 28, wherein the data for managing the output situation to the output device contains data as to meanings, display positions, and display of items indicated on a display.

30. The natural language processing system according to claim 21, wherein the computer executes in parallel a series of processes for outputting results of the execution corresponding to the character strings and the process for storing the information as to the operating status of the processor system to the storage with use of the character strings of the natural language from the input device for the computer.

* * * * *

UNITED STATES PATENT AND TRADEMARK OFFICE
CERTIFICATE OF CORRECTION

PATENT NO. : 5,321,608
DATED : June 14, 1994
INVENTOR(S) : Yasuharu Namba, et al.

It is certified that error appears in the above-indentified patent and that said Letters Patent is hereby corrected as shown below:

Title Page: Item

[75] Inventors: Yasuharu Namba

In the Claims:

Claim 1, column 28, line 18, delete "i" and substitute therefor --in--.

Claim 2, column 28, line 34, delete "A" and substitute therefor --a--.

Claim 21, column 30, line 47, delete ";".

Claim 26, column 32, line 1, delete "int he" and substitute therefor --in the--.

Signed and Sealed this

Twenty-seventh Day of September, 1994

Attest:

BRUCE LEHMAN

*Attesting Officer*    *Commissioner of Patents and Trademarks*